United States Patent
Kempel et al.

(10) Patent No.: US 10,600,295 B2
(45) Date of Patent: Mar. 24, 2020

(54) SYSTEM AND METHOD FOR THREAT MONITORING, DETECTION, AND RESPONSE

(71) Applicants: Doron Kempel, Boston, MA (US); Ron Asher, Tel-Aviv (IL)

(72) Inventors: Doron Kempel, Boston, MA (US); Ron Asher, Tel-Aviv (IL)

(73) Assignee: TG-17, Inc., Boston, MA (US)

( * ) Notice: Subject to any disclaimer, the term of this patent is extended or adjusted under 35 U.S.C. 154(b) by 145 days.

(21) Appl. No.: 15/956,456

(22) Filed: Apr. 18, 2018

(65) Prior Publication Data

US 2018/0322749 A1 Nov. 8, 2018

Related U.S. Application Data

(60) Provisional application No. 62/501,881, filed on May 5, 2017, provisional application No. 62/516,407, filed (Continued)

(51) Int. Cl.
*G08B 13/196* (2006.01)
*G08B 25/10* (2006.01)
(Continued)

(52) U.S. Cl.
CPC ..... *G08B 13/19608* (2013.01); *G05D 1/0016* (2013.01); *G05D 1/0027* (2013.01);
(Continued)

(58) Field of Classification Search
CPC ...... G08B 13/196; G08B 25/00; G08B 25/10; B63G 8/38; B64F 1/04; B64C 39/02; H04N 1/00
See application file for complete search history.

(56) References Cited

U.S. PATENT DOCUMENTS 9,589,448 B1 3/2017 Schneider et al.
9,888,133 B2 * 2/2018 Kida ................. H04N 1/00129
(Continued)

FOREIGN PATENT DOCUMENTS

EP 3032508 A1 6/2016
EP 3118826 A1 1/2017

OTHER PUBLICATIONS

International Search Report and Written Opinion in International Application No. PCT/US2018/031121 dated Jul. 28, 2018.
International Preliminary Report on Patentability issued in corresponding international application No. PCT/US2018/031121 dated Aug. 23, 2019.

*Primary Examiner* — Yuri Kan
(74) *Attorney, Agent, or Firm* — Polsinelli, PC

(57) ABSTRACT

A drone receives an activation command indicating a user's need for monitoring, and is deployed based on the activation command and a set of initial operational parameters. The drone autonomously navigates to a first position with respect to the user and performs a first configured action. A plurality of monitoring data signals corresponding to the user and surrounding environment is captured using sensors on the drone, and is wirelessly transmitted by the drone to a remote monitoring system. The monitoring data signals are continuously analyzed to generate updated operational parameters causing the drone to autonomously navigate to a second position and perform a second configured action. A third configured action is received by the drone from the remote monitoring system, wherein the third configured action is generated based on a threat analysis performed by the remote monitoring system on the monitoring data signals.

35 Claims, 6 Drawing Sheets

Related U.S. Application Data on Jun. 7, 2017, provisional application No. 62/543,490, filed on Aug. 10, 2017.

(51) Int. Cl.
*B64C 39/02* (2006.01)
*H04N 1/00* (2006.01)
*G05D 1/00* (2006.01)
*G08B 25/01* (2006.01)

(52) U.S. Cl.
CPC ....... *G05D 1/0094* (2013.01); *G08B 13/1965* (2013.01); *B64C 39/024* (2013.01); *B64C 2201/126* (2013.01); *B64C 2201/141* (2013.01); *B64C 2201/146* (2013.01); *G08B 25/016* (2013.01)

(56) References Cited

U.S. PATENT DOCUMENTS

| | | | |
|---|---|---|---|
| 2015/0183498 A1* | 7/2015 | Wardle | B63G 8/38 |
| | | | 114/337 |
| 2015/0339912 A1* | 11/2015 | Farrand | G08B 25/001 |
| | | | 340/501 |
| 2016/0042637 A1* | 2/2016 | Cahill | G08B 25/10 |
| | | | 701/3 |
| 2016/0068264 A1 | 3/2016 | Ganesh et al. | |
| 2016/0340021 A1 | 11/2016 | Zhang et al. | |
| 2017/0092109 A1* | 3/2017 | Trundle | G08B 25/006 |
| 2018/0029706 A1* | 2/2018 | Baruch | H04W 76/14 |
| 2018/0244402 A1* | 8/2018 | Kahlon | B64F 1/04 |

\* cited by examiner

SYSTEM AND METHOD FOR THREAT MONITORING, DETECTION, AND RESPONSE

CROSS-REFERENCE TO RELATED APPLICATIONS

This application claims the benefit of priority to U.S. Provisional Application No. 62/501,881 filed May 5, 2017 and entitled "SYSTEM AND METHOD FOR THREAT MONITORING, DETECTION, AND RESPONSE"; to U.S. Provisional Application No. 62/516,407 filed Jun. 7, 2017 and entitled "SYSTEM AND METHOD FOR REAL-TIME DECODING AND MONITORING FOR ENCRYPTED INSTANT MESSAGING AND OTHER INFORMATION EXCHANGE APPLICATIONS"; and to U.S. Provisional Application No. 62/543,490 filed Aug. 10, 2017 and entitled "SYSTEM AND METHOD FOR THREAT MONITORING, DETECTION, AND RESPONSE", the disclosures of each of which are herein incorporated by reference in their entirety.

TECHNICAL FIELD

The present disclosure pertains to monitoring systems and devices, and more specifically to systems and methods for providing automated personalized monitoring and other interactions.

BACKGROUND

Even as technology has advanced and born rise to more advanced threats and even entirely new types of threats, conventional threat monitoring and response systems have remained largely manual (e.g., an individual monitoring security video feeds) or even wholly physical (e.g. a personal bodyguard). These solutions are inefficient, cumbersome, and oftentimes quite expensive.

An additional issue arises with younger individuals who were born and raised in the midst of this current digital age, surrounded by technology but often lacking a general awareness of their surroundings and an understanding of how to respond to uncomfortable situations, e.g. those individuals colloquially referred to as lacking 'street-smarts'. As such, even in societies that are today safer than ever before, increased feelings of insecurity, unease, or other discomfort can be experienced by individuals when interacting in the world beyond their homes and/or computing devices. Accordingly, perceived comfort and perceived exposure to threats are increasingly important factors that are not addressed by conventional threat monitoring and response systems, which are driven by the perspective of the individual performing the monitoring rather than the perspective of the individual subject to the monitoring. As such, it would be desirable to provide a threat monitoring and response system that can operate autonomously in response to one or more initial inputs based on the perceived comfort, exposure to threats, or other desires of the individual subject to the monitoring.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
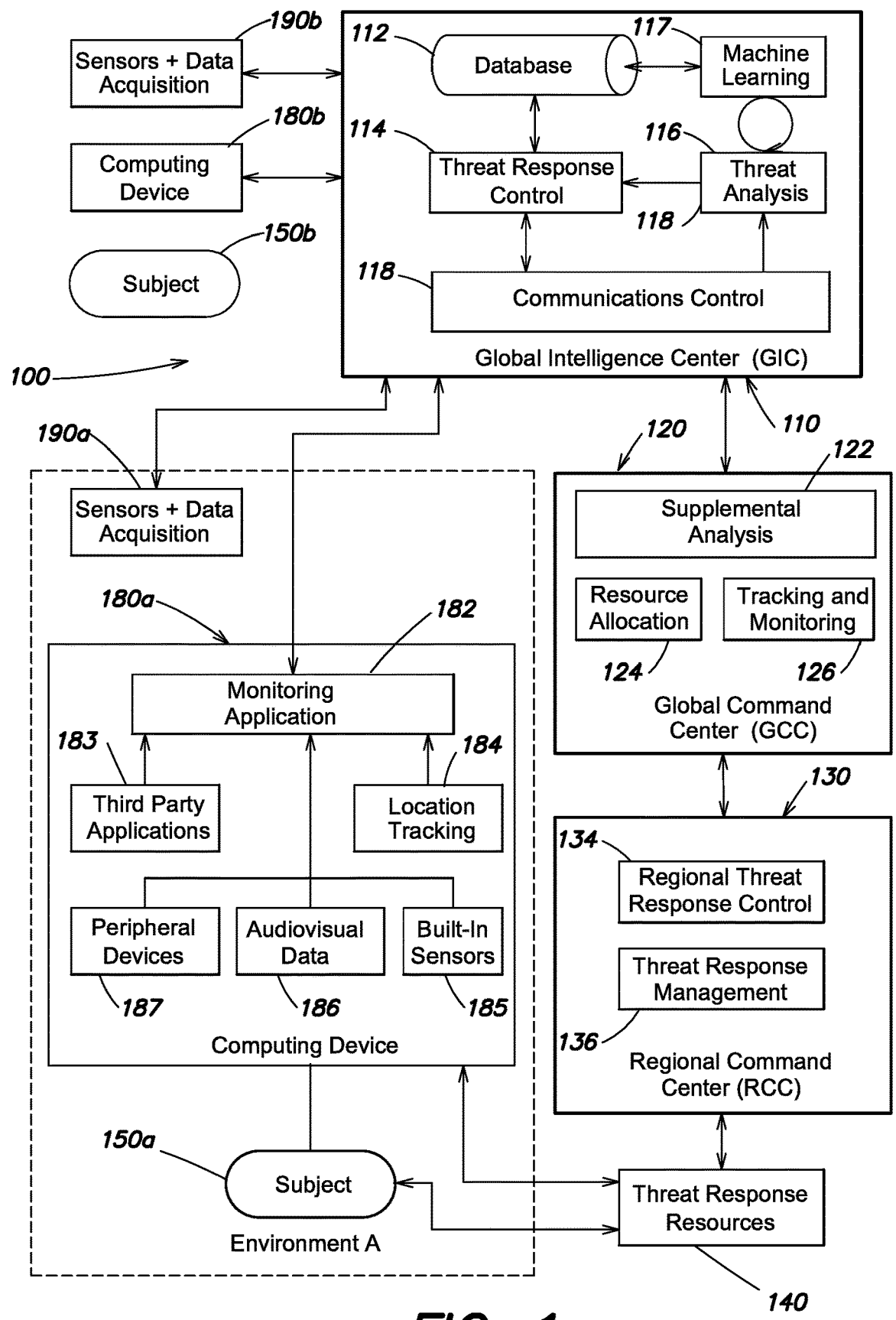
FIG. 1 depicts an exemplary architecture diagram of a threat monitoring and response system of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

The disclosed threat monitoring and response system is best understood in the context in which it is employed. Accordingly, FIG. 1 depicts an illustrative architecture of a threat monitoring and response system 100 in which aspects of the present disclosure may operate. Bolded solid line boxes indicate constituent components of the system 100 itself, non-bolded solid line boxes indicate sub-components of system 100, ovals indicate individuals interacting with and being monitored by system 100, and arrows indicate communicative couplings between the various components, sub-components, and individuals. Dotted line boxes indicate regions, environments, or areas in which threat monitoring and response system 100 is implemented, or alternatively, may be thought of as indicating a logical partitioning of one or more individuals interacting with system 100.

Broadly, threat monitoring and response system 100 consists of three primary components: a Global Intelligence Center (GIC) 110, one or more Global Command Centers (GCCs) 120, and one or more Regional Command Centers (RCCs) 130. As used herein, the phrase 'remote monitoring system' or 'remote command center' can be used to refer to threat monitoring and response system 100 or to refer to any combination of GIC 110, GCCs 120, RCCs 130, their components, sub-components, or any combination of the functionality attributed to them in the present disclosure. The users of threat monitoring and response system 100 can be classified as Guardians, Subjects, or both. As used herein, the term Guardian is used to refer to a responsible party which requests the supervision of a Subject that is to be placed under the monitoring or other services provided by system 100. Both Subject and Guardian roles may be fulfilled by individuals, combinations of individuals, and entities, and furthermore, the two types of roles are not mutually exclusive. Of particular note to the present disclosure, self-Guardianship is also contemplated, wherein a given individual registers themselves with threat monitoring and response system 100 as a Subject. Such a use case can be particularly important in the numerous scenarios in which individuals, even those with families or other close human connections, find themselves alone—even the most social individuals will find themselves in moments where their 'social safety net' is not present. Accordingly, it would be desirable to configure threat monitoring and response system 100 to: a) provide an additional layer of security in situations in which a Subject is with friends and family; and b) provide proactive security and explicit reassurance and/or deterrence measures in situations in which a Subject is alone or otherwise feels uncomfortable and desires reassurance.

In other words, while system 100 is referred to as 'threat monitoring and response' system 100, the word 'threat' is not necessarily or exclusively used in the traditional sense of the word which typically denotes scenarios in which bodily harm or damage seems imminent. Importantly, it is noted that the word 'threat', as used herein, is extended beyond this traditional understanding and is used broadly to encompass any scenario, whether physical or digital, in which an individual feels traditionally threatened, or also uncomfortable, confused, scared, lost, lonely, or otherwise desiring of some form of assistance and/or reassurance. The word 'threat response' is similarly and necessarily broadened to encompass the range of actions taken to alleviate such feelings of threats, whether perceived or actual. As such, the assistance associated with a 'threat response' is not limited solely to resources such as law enforcement or emergency medical services. Rather, a 'threat response' is any physical or digital resource, or any set of actions, that are employed in order to resolve a threat to an individual.

For example, in the particular context of the present disclosure, a threat might be an indication (received or detected) that a Subject feels uncomfortable in their current environment for any variety of reasons. The particular details (or the validity) of these reasons may not initially be important, or even apparent, and an immediate threat response might be to launch or otherwise deploy a personal safety drone stored on or near the Subject's person. In some embodiments, the personal safety drone might be activated and launched by the threat monitoring and response system 100, for example based on a threat situation detected by the system, or based on a request received by the Subject (or a Guardian of the Subject). In some embodiments, the personal safety drone might be activated and launched by the Subject directly, for example by the actuation of a mechanical button or control of the personal safety drone, or by the actuation of a software button in a GUI of a control application associated with the personal safety drone. In this manner, a personal safety drone can be launched based on a threat detected by threat monitoring and response system 100, or can be launched based on a Subject-provided or Subject-initiated indication of duress, stress, or threat.

Such personal safety drones can capture and transmit additional monitoring data (e.g. audio, visual, both) to allow threat monitoring and response system 100 to better assess the Subject's environment and current situation in order to thereby make an accurate threat determination or assessment. Additionally, in the case that the threat escalates, a stronger threat response can be more quickly selected and more efficiently deployed. Importantly, the deployment of such personal safety drones, in some cases even before threat monitoring and response system 100 has completed its threat analysis, functions as an initial threat response that can provide valuable and tangible reassurance to a Subject, e.g. the Subject is reassured by seeing a personal safety drone hovering 10 feet above his head and tracking to his movements, as will be described in greater detail below. Similarly, the deployment of such a personal safety drone can provide an effective deterrent in situations where a threat is still ongoing, e.g. a potential mugger will be far less willing to commit a crime while a personal safety drone is hovering overhead and recording video that tracks the scene and captures identifying (and incriminating) information of the mugger.

Before providing a more detailed discussion of the use of such personal safety drones and specific examples in which they may be deployed, the disclosure turns first to a brief discussion of the context in which such drones may operate. More particularly, the architecture and functionality of threat monitoring and response system 100 is outlined briefly below.

Threat monitoring and response system 100 is organized in a hierarchical arrangement. At the top is Global Intelligence Center (GIC) 110, which functions as a central hub or operations management center for the overall system. Directly below GIC 110 are one or more Global Command Centers (GCCs) 120, which are themselves each responsible for one or more Regional Command Centers (RCCs) 130. The RCCs 130 can often be responsible for handling direct communication, organization, and oversight of one or more threat response resources 140, which are typically regionally local to RCC 130, although it is also possible that these responsibilities can be performed by GIC 110 or GCCs 120. The threat response resources 140 can include one or more personal safety drones which are stored either local to or on the person of a Subject. In some embodiments, the threat response resources available to the threat monitoring and response system 100 can further include area security drones (discussed with respect to FIGS. 3A-C), stored or deployed in a distributed fashion to provide threat responses to multiple Subjects within an assigned area. Regardless of the composition of the threat response resources 140, the aforementioned organizational structure of threat monitoring and response system 100 can provide effective coverage of widespread or geographically vast areas. For example, in some embodiments threat monitoring and response system 100 might consist of a single GIC 110 which communicates with one GCC 120 provided for a given country, with each country divided into several RCCs 130 (e.g. by state, province, etc.). These three constituent components are discussed in turn below.

Global Intelligence Center (GIC)

Global Intelligence Center (GIC) 110 provides functionalities which include, but are not limited to, receiving incoming data flows, analyzing incoming data, identifying threats and potential threats, and generating or otherwise triggering suitable threat responses. As illustrated in FIG. 1, GIC 110 consists of five primary components: Database 112 (alternatively referred to herein as a repository 112 or mission repository 112, Threat Analysis system 116, Threat Response control system 114, Machine Learning system 117, and Communications control system 118. In some embodiments, GIC 110 may be automated such that the presently disclosed threat monitoring and response does not require human input, intervention, or control, although it is also possible that GIC 110 is staffed with one or more human command center agents to provide semi-autonomous or manual threat monitoring and response functionalities to the system 100. Likewise, one or more of GCCs 120 and RCCs 130 can be configured to be autonomous, semi-autonomous, or staffed with human command center agents.

Communications control system 118 is operative to handle incoming and outgoing communications and data transmissions for GIC 110. For example, Communications control system 118 can be responsible for initiating or responding to communications with Subjects and Guardians registered with threat monitoring and response system 100, for communicating with law enforcement or other threat response resources such as personal safety drones and area security drones, and for communicating with the GCCs 120 and/or RCCs 130. Communications Control system 118 can additionally provide routing and distribution functionalities within GIC 110 such that incoming communications or data transmission are directed to the appropriate sub-system contained within GIC 110.

Database 112 provides record-keeping and data storage functionality for GIC 110. In terms of record-keeping functionality, it is contemplated that each registered Subject, Guardian, and/or Subject-Guardian pair can be associated with a profile stored in database 112, and further, that any detected threats (false positive, legitimate, or otherwise) and subsequent actions can likewise be stored in database 112 in association with the corresponding profile to which the threat and/or action pertains. In terms of data storage functionality, it is contemplated that GIC 110 will ingest large streams of continuous or near-continuous monitoring data from various sources. The ingested monitoring data may pertain to multiple Subjects registered with threat monitoring and response system 100, and are stored in database 112 for subsequent processing and/or further use by GIC 110.

Threat Analysis system 116 provides an automated (or semi-automated) determination of whether a given portion of input monitoring data contains indications of a threat, or a potential threat, by examining incoming monitoring data for patterns or characteristics that are linked to threats and potential threats. For example, if the monitoring data is an audio recording, Threat Analysis system 116 could parse the audio for sound signatures associated with gunshots, screaming, or other indications of violence or possible duress, or could perform speech recognition to analyzing the verbal content of the speech for one or more threats. It is important to note that Threat Analysis system 116 does not operate in a simplistic and predictable manner. Instead, the determination made by Threat Analysis system 116 is highly contextual and can involve input monitoring data from a variety of sources. This manner of operation greatly reduces the number of false alarms and better allows true and legitimate threats to be detected and assigned a confidence level.

Confidence levels can be calculated in order to reflect the probability that Threat Analysis system 116 has correctly identified a threat, or the probability that a potential threat at least exists. This confidence level can be used as an input for many subsequent actions. For example, the confidence level can be utilized by Threat Response control system 114 to better determine an appropriate threat response type or level, e.g. balancing between a worst case scenario and a best case scenario possible given the confidence level.

In some embodiments, various thresholds on the confidence level can be set and utilized to trigger supplemental analysis beyond that offered by Threat Analysis system 116. For example, a 50% confidence level might indicate that the Threat Analysis system 116 obtained inconclusive results, and supplemental analysis is necessary to see if the confidence level can be adjusted either up or down. In some embodiments, the supplemental analysis can be provided by a second instance of the same or a substantially similar autonomous threat analysis system, although in other embodiments, an entirely different autonomous threat analysis system might be employed. In still further embodiments, the supplemental analysis might be performed by one or more human command center agents to review the monitoring data and make their own threat assessment. Regardless of how the supplemental analysis is configured, the output of the original autonomous analysis is then combined with the output of the supplemental analysis according to a desired weighting scheme. In some embodiments, the original autonomous analysis might be given a weight of zero, such as when human command center agents are employed for the supplemental analysis, such that the system gives 100% weight to the human decision.

Described above are certain scenarios in which human command center agents are activated in order to resolve an uncertain threat level. In additional scenarios, human command center agents may be activated in response to a threat being identified with a high confidence level, based on the autonomous analysis of Threat Analysis system 116, a user (e.g. Subject or Guardian) communication, or both. Such a transition from an autonomous threat response mechanism to a human command center agent threat response mechanism can be mandated in various legal jurisdictions in which one or more aspects of the presently disclosed threat monitoring and response system 100 may operate. In some embodiments, the human command center agents described above might be located in, or co-located with, GIC 110, in order to thereby provide supplemental analysis to Threat Analysis system 116. Similarly, human command center agents might be located in, or co-located with, one or more of the GCCs 120 and the RCCs 130. It is further contemplated that human command center agents can also be remotely associated with any one of GIC 110, GCCs 120, and RCCs 130, as is desired.

Returning now to a discussion of the Threat Analysis system 116, the system operates on the basis of three types of analyses relative to the Subject: Routine, Reality, and Context. Routine analysis examines behavioral patterns of the Subject, and over time allows Threat Analysis system 116 to construct a comprehensive profile of the Subject—a picture of his daily life and an understanding of his habits. The second tier of analysis, Reality, corresponds to threats or potential threats that are derived from threat monitoring and response system 100 alone, reflecting the system's perception of reality and how accurate it is believed to be (i.e. confidence level). The third tier of analysis is Context, which can be based upon external information not received from the Subject or a device associated with the Subject. Instead, contextual analysis pulls input data from otherwise seemingly unrelated or unassociated sources, and in some embodiments, may further implement predictive aspects relating to predicted threats that may emerge in the future.

Particularly in the case of reality and contextual analyses, Threat Analysis system 116 may require additional information to assist in making a threat-level determination (e.g. received data indicates a threat but the data is of very low quality), or may require additional information to confirm a contextually aware threat-level determination (e.g. gunshots or police sirens in a song do not indicate a Subject is in the midst of a police chase). Threat Analysis system 116 may have direct access to suitable sensors or other monitoring data collection devices, for example by way of the sensors and data acquisition means 190*a*, 190*b* that are coupled to GIC 110. However, in instances where additional desired or contextual information is not immediately available, Threat Analysis system 116 can cause GIC 110 to transmit a command to activate or deploy a personal safety drone stored on or near the person of the Subject in question, wherein the personal safety drone contains one or more cameras or microphones and is remotely controlled or directed to autonomously obtain additional monitoring data suitable to aid in determining whether or not a threat is truly present. In general, Threat Analysis system 116 is designed to be a form of contextually aware artificial intelligence, such that incoming monitoring data for a given Subject is considered in totality, rather than in isolation. That is, Threat Analysis system 116 does not simply examine the incoming monitoring data and look for the presence of a series of known threat indicators or pre-defined rules. Instead, Threat Analysis system 116 is continuously trained and improved via a Machine Learning system 117, which enables threats and potential threats to be detected with an increasing accuracy over time.

In an initial training period, Machine Learning system 117 is provided with training data, or sets of monitoring data that are known to contain indications of threats and potential threats. Machine Learning system 117 is also provided with the correct result for each individual set of training data, but is not provided with any indication of why the result is correct or how the determination is to be made. In some embodiments, Machine Learning system 117 can be provided as a neural network, although various other machine learning techniques may be employed. On the basis of this training data, Machine Learning system 117 forms an initial pattern-recognition system for classifying monitoring data. This initial pattern-recognition system is often unpredictable, as it is entirely derived from the Machine Learning system 117, rather than typical human decision making patterns. Depending on how Machine Learning system 117 is configured, the output of the initial pattern-recognition system will vary, even when the exact same training data is used.

This initial pattern-recognition system is then transmitted to Threat Analysis system 116, thereby initializing it to classify incoming monitoring data and identify threats and potential threats. Every time Threat Analysis system 116 identifies a threat or a potential threat, it is saved to database 112, where it can be associated with one or more of the corresponding Subject's profile and a knowledge base for Machine Learning system 117. Once a potential threat has been resolved, its entry in database 112 can be updated to indicate whether or not the potential threat was in fact a threat. In other words, the entry is updated to indicate whether or not (or the degree to which) Threat Analysis system 116 was correct. These updates provide a continuous source of additional training data for Machine Learning system 117, thereby allowing Threat Analysis system 116 to be refined and improved based on real world conditions and outcomes. As such, it would be expected that the number of false alarms arising for a given reason would decline over time, as Machine Learning system 117 updates Threat Analysis system 116 to better reflect reality, to the point that Threat Analysis system 116 is highly unlikely to make the same mistake twice.

Threat Response control system 114 is operative to receive indications of threats and potential threats identified by Threat Analysis system 116 and to receive indications of threats and potential threats identified by a user (Subject or Guardian). Regardless of whether threats and potential threats are flagged by threat monitoring and response system 100, or by its users, the Threat Response control system 114 can control subsequent communications with GCCs 120, RCCs 130, and/or threat response resources 140 in order to further oversee and orchestrate any needed threat responses. In some embodiments, different levels of threat response may be offered, such that Threat Response control system 114 consults a Subject profile in database 112 to determine preferred threat responses, forbidden threat responses, etc. as indicated by Subject preferences and/or restrictions contained in the corresponding Subject profile.

Threat Response control system 114 may additionally consult an RCC 130 that is most closely associated with the Subject experiencing the potential threat, although it is noted that it is not necessarily the case that there is a one-to-one correspondence between the number of regions and the number of RCCs 130. This consultation may be necessary because different ones of the RCCs 130 can be associated with a different selection of threat response resources 140, which can include, for example, law enforcement, emergency response services, private security services, private individuals, autonomous vehicles, etc.

Global Command Center (GCC)

Global Command Center (GCC) 120 consists of a Supplemental Analysis system 122, a Resource Allocation system 124, and a Tracking and Monitoring system 126. Supplemental Analysis system 122 is operable to provide supplemental threat analysis in situations in which the confidence level of a potential threat identified by Threat Analysis system 116 is too low for GIC 110 to make a final assessment or take action. As described above, Supplemental Analysis engine 122 may perform autonomous or semi-autonomous threat analysis in a same or different manner as compared to Threat Analysis system 116, or may perform manual threat analysis driven by human intelligence officers trained to recognize and distinguish threats.

Tracking and Monitoring system 126 is operable to oversee all ongoing threat responses under the domain of threat monitoring and response system 100, as well as to oversee the general status of registered Subjects and Guardians. That is not to say that Tracking and Monitoring system 126 performs active monitoring in the sense of Threat Analysis engine 116 or Threat Response control system 114, but rather, that Tracking and Monitoring system 126 monitors for general system health and ensures that Subjects and Guardians remain online and connected to GIC 110. For example, Tracking and Monitoring system 126 would detect and generate a notification if a Subject or Subject monitoring application suddenly went offline or otherwise ceased to transmit monitoring data, and is further operable to maintain a listing of available threat response resources 140. This listing of available threat response resources allows Resource Allocation system 124 to dynamically reconfigure the allocation of threat response resources 140 across various regions and/or environments. For example, if a first region has no available threat response resources and an adjacent region has a large amount of idle threat response resources, then Resource Allocation system 124 can command a portion of the idle threat response resources to move into the first region. In this fashion, the GCCs 120 act as stabilizing forces, providing supplementary analysis to the GIC 110 above them in the hierarchy, and providing tracking of system health and corresponding threat response resource allocation to the RCCs below them in the hierarchy.

Regional Command Center (RCC)

Below GCC 120 is the Regional Command Center (RCC) 130, which is responsible for oversight and interaction with Subjects and threat response resources within its assigned regions. As illustrated, RCC 130 consists of a Regional Threat Response control system 134 and a Threat Response Management system 136. Although smaller in scale, the functionality of Regional Threat Response control system 134 is similar, or even identical in some embodiments, to that of Threat Response control system 114 of GIC 110. In effect, Regional Threat Response control system 134 plays a direct role in overseeing active threat responses and handling any requests from Subjects or Guardians.

For example, Regional Threat Response control system 134 may receive a communication from a Subject expressing unease about an ongoing situation that has not been detected by GIC 110, e.g. the Subject is walking home alone in the dark and feels frightened and uncomfortable. At this point, Regional Threat Response control system 134 can execute a threat response to assuage the Subject's fear(s) and provide some degree of reassurance, for example by launching or deploying a personal safety drone stored on or near the Subject's person, as has been mentioned previously. This drone can deploy to some height above the Subject and perform a following function, providing an open monitoring link between the Subject and the threat monitoring and response system 100.

Once the personal safety drone has been deployed, Regional Threat Response control system 134 (or some other component of threat monitoring and response system 100) can receive streaming monitoring data from one or more sensors of the personal safety drone. This streaming monitoring data can be analyzed, either in isolation or in combination with previously received monitoring data, to continually search for any threats or potential threats in the vicinity of the Subject. In some embodiments, the threshold for detecting a threat can be lower in scenarios in which the Subject has explicitly requested monitoring due to his or her unease. If a threat is detected, Regional Threat Response control system 134 can either defer control to GIC 110 and the threat response mechanisms described above, or can itself directly execute a threat response.

The above discussion presents a brief overview of the various components, sub-components, systems, and sub-systems that comprise the example architecture of threat monitoring and response system 100 as depicted in FIG. 1. The disclosure turns now to a discussion of the Subjects and their interaction(s) with threat monitoring and response system 100, which is enabled by a monitoring application acting as a bridge between the two, amongst other functionalities.

Subjects and Monitoring Application

It is contemplated that each Subject can be associated with one or more computing devices in order to communicate and interact with various components of threat monitoring and response system 100. For example, FIG. 1 illustrates (in Environment A) a Subject 150*a* with an associated computing device 180*a* which permits Subject 150*a* to interact with threat monitoring and response system 100. Computing device 180*a* can comprise various different computing devices, which can include, without limitation, laptop computers, desktop computers, mobile computing devices, cell phones, tablet devices, wearable devices, smart watches, and various other electronic devices variously capable of receiving one or more user inputs and performing wired or wireless electronic communication of data. In some embodiments, a Subject (or Guardian) may be associated with two or more computing devices, such as a smartphone and a smart watch. For the purposes of the present disclosure, such combinations of paired computing devices are included under the label of 'computing device'.

As illustrated in FIG. 1, computing device 180*a* includes a monitoring application 182 which acts as a bridge or connection point between Subject 150*a* and threat monitoring and response system 100. Coupled to monitoring application 182 are five additional component groupings which permit monitoring application 182 to collect data transmitted, received, or generated by computing device 180*a*. Such data can include, without limitation, the contents of text messages, the contents of voice calls, keyboard inputs, user inputs/interactions with one or more third party applications 183, GPS or position information from a location tracking system 184, other information collected from one or more built-in sensors 185, pictures and videos from an audiovisual capture system 186, and additional information collected from one or more peripheral devices 187.

Peripheral devices 187 can include specialized hardware designed to communicatively couple with the computing device 180*a* and provide a specific or specialized monitoring data to GIC 110. For example, peripheral devices 187 could include a breathalyzer, an infrared camera, a weight sensor, a facial recognition system, a speech recognition system, an external visual light camera, an external microphone, a gas sensor, and other sensors that are known and appreciated in the art. In some embodiments, the peripheral devices 187 can include a personal safety drone, for example, stored on the Subject's belt loop or backpack and wirelessly connected to computing device 180*a* to await activation, deployment, or other commands. In some embodiments, the peripheral devices 187 might be provided by a third party, or might be provided as a portion of threat monitoring and response system 100.

In some embodiments, it can be desirable to provide Subject 150*a* with at least one wearable computing device in order to avoid issues and challenges surrounding maintaining monitoring coverage during moments wherein the Subject is not proximate to computing device 180*a*. In some embodiments, the wearable computing device can be provided as one or more of the peripheral devices 187. A wearable computing device has the advantage of being much more challenging, if not impossible, to inadvertently separate from a Subject. For example, Subject 150*a* would be much more likely to forget or otherwise be separated from a smart phone than a smart watch. Wearable devices have the additional advantage of being able to provide biometric data of the Subject, which otherwise may not be detectable from a more traditional computing device such as a laptop computer or cell phone (although some traditional computing devices include, via built-in sensors 185, fingerprint scanners, retina scanners, etc.). Biometric data collected by an additional wearable device might include heart rate, perspiration rate, body temperature, and blood pressure. In some embodiments, one or more biometric measurements can be used to assess a stress level of Subject 150*a*, such that these stress levels can function as a trigger to deploy the personal safety drone to capture and transmit to threat monitoring and response system 100 additional information regarding any potential threat or events that may have caused the unusually high stress levels. Similarly, a highly unusual biometric reading in and of itself can trigger the personal safety drone deployment, e.g. a measured heart rate of 10 beats per minute could trigger one or more of peripheral devices 187 to be launched. For example, a personal safety drone could be deployed to determine whether the biometric sensor is providing a faulty reading or if Subject 150a is experiencing a significant cardiac distress event. Furthermore, in the context of personal safety drones, it is noted that wearable devices have an additional advantage of oftentimes maintaining a better line of sight (and hence, a stronger wireless connection) with a personal safety drone that awaits a launch or deployment command and/or configuration from one of the computing devices of Subject 150a.

Personal Safety Drone

In some embodiments, as mentioned in various sections above, a personal safety drone can be integrated with threat monitoring and response system 100. In some embodiments, a personal safety drone might fall under the categorization of a peripheral device 187, or might fall under the categorization of a threat response resource 140. In some embodiments, personal safety drones might comprise their own categorization or classification in threat monitoring and response system 100. While 'drones' are most commonly understood to comprise aerial (e.g. rotor-driven) craft and other Unmanned Aerial Vehicles (UAVs), in the context of the present disclosure, drones are understood to include various other manner of unmanned craft, vehicles, ships, etc. For example, drones can additionally include land-based vehicles or robots, surface ships, sub-surface vessels, etc. Because the drone is contemplated as a personal safety drone, it is generally configured to be of a size and weight that is easily portable and easily manageable by any given Subject such that the drone can be stored on the Subject's person without causing any undue burden.

In general, it is contemplated that the personal safety drone is stored on or near the Subject's person, such as in a pocket, purse, bag, backpack, carrying case, holster, clipped or attached to a belt, vest, pant leg, etc. In some embodiments, the personal safety drone can be directly attached or stowed, although it is also possible that a docking station or carrying case apparatus can be used to both stow the drone and to attach it to the Subject's person or other desired location. Such a docking station or carrying case apparatus can provide protection to the personal safety drone, can recharge the personal safety drone, provide additional processing power, communication capabilities/range, additional sensing capabilities, assisted launch capabilities, assisted landing capabilities, etc. Regardless of the precise manner in which the personal safety drone has been stowed on or near the Subject's person, it is contemplated that the personal safety drone can be quickly and activated and launched to perform one or more desired or configured actions, as will be discussed in the following section of this disclosure.

The activation and launch of the personal safety drone can occur in response to a command or request from the Subject, or in response to a command from the threat monitoring and response system 100. While the following description of command inputs to the personal safety drone is given in the context of activation commands, it is appreciated that these example commands can also be given to the personal safety drone once it has already been activated and deployed.

Commands received from the threat monitoring and response system 100 can be classified based on the specific component of system 100 which originated the command, e.g. GIC 110, GCC 120, or RCC 130, wherein different priorities might be associated with different origination points. However, it is noted that for the sake of brevity and clarity, future reference herein will follow the convention of referring simply to communication or commands originating from the threat monitoring and response system 100 as a whole, although it is appreciated that such references can include any of the specific particular components and sub-components of threat monitoring and response system 100 without departing from the scope of the present disclosure. Commands from threat monitoring and response system 100 can be transmitted directly between system 100 and the personal safety drone (requiring the personal safety drone to have high-power/long-range wireless transceivers) or can be relayed to personal safety drone using one or more intermediates such as monitoring application 182 running on the Subject's computing device 180a (allowing the personal safety drone to have lower power and lower range wireless transceivers). These wireless commands can be based on a threat or potential threat detected by the threat monitoring and response system 100, using various sources and streams of monitoring data that pertain to the Subject, an environment surrounding the Subject, or other associations with the Subject. If a threat is detected, the personal safety drone can be launched as a deterrent or direct threat response mechanism. If only a potential threat is detected, or threat monitoring and response system 100 otherwise exhibits a suitable degree of uncertainty, the personal safety drone can be launched to reassure the Subject and/or provide additional monitoring data to enable a supplemental threat analysis to be performed against the potential threat.

Commands received from the Subject can be classified as either direct or indirect. Direct commands are those received at one or more sensors of the personal safety drone and interpreted onboard. Indirect commands are those received at one or more intermediate components (such as monitoring application 182) and then relayed to a wireless transceiver of the personal safety drone as either already interpreted commands or as raw sensor data for onboard interpretation. In some instances, the same type of Subject action or input can be classified as either a direct or indirect command, depending upon the specific scenario. For example, a voice input from the Subject saying "Launch drone!" would be a direct command if received by a microphone of the personal safety drone, but would be an indirect command if received by a microphone of the Subject's computing device and then relayed to the personal safety drone via monitoring application 182. The same is true of gesture commands captured by an image sensor, which can be located on the personal safety drone or on the Subject's computing device. In some embodiments, it can be desirable for a given Subject action or input such as saying "Launch drone!" be captured by both the personal safety drone and the monitoring application 182, such that both a direct command and an indirect command are received. This redundancy can help avoid misinterpreting or failing to capture commands originating from the Subject. In addition to verbal and gesture inputs from the Subject, a direct physical input command could also be given by the actuation of a 'launch' button or trigger on the body of the personal safety drone, or the actuation of a 'launch' button or trigger on the body of a docking station or carrying case of the personal safety drones. These physical input commands to the personal safety drone may be subject to less interpretation or scrutiny than the verbal and gesture inputs which are wirelessly received, as the physical input commands are based on a physical state change which is not subject to interpretation (i.e. changing a button from 'ON' to 'OFF'), whereas the verbal and gesture inputs requiring parsing and command extraction which is subject to interpretation (i.e. was the voice input 'go DOWN' or 'go AROUND'?). Finally, indirect physical input commands can be given via a Subject interaction with a touchscreen GUI of monitoring application 182, wherein the Subject's finger or a style can be used to select various options within the monitoring application 182 for transmission to the personal safety drone. For example, an activation command could be given by selecting a 'launch' button in the GUI of monitoring application 182, wherein the launch command is wirelessly relayed (e.g. WiFi, Bluetooth, NFC, etc.) from the Subject's computing device to the personal safety drone.

Various Subject commands and inputs that can be received in the GUI of monitoring application 182 will be discussed in greater depth in the follow section—for the meantime, the disclosure remains focused on the personal safety drone. In the case of an aerial personal safety drone, it is contemplated that such personal safety drones can be manufactured with various lightweight materials in order to reduce the burden on the Subject when carrying the stored personal safety drone and to increase the maximum flight time of the personal safety drone for a given battery capacity (or other stored energy capacity). The personal safety drone can also be manufactured with a folding design that enables it to be stored in a more compact configuration (e.g. a lesser volume) than it occupies in its fully deployed state. In some embodiments, and as briefly mentioned above, the personal safety drone can be designed to fit within a docking station or carrying case, which might also include an integrated battery to charge the personal safety drone automatically when it is in the stowed state. The carrying case might have a mechanical docking connector that mates with a charging port on the personal safety drone, or the carrying case can include a wireless charging coil that can charge the personal safety drone without requiring it to be placed within the carrying case in a specific configuration. In some embodiments, the mechanical docking connector can include a launch mechanism, e.g. a spring that is placed under tension when the personal safety drone is stored in the carrying case and provides a launch force when the carrying case is opened.

Upon launch, the personal safety drone becomes airborne quickly and can follow a launch or initialization sequence, e.g. upon launch activate all onboard sensors and fly to a height of 10 feet. In some embodiments, this launch or initialization sequence can be configured by a set of one or more initial operational parameters, which are either stored in an onboard memory of the personal safety drone or are received by the personal safety drone as part of the activation command. In order to configure itself and perform according to these initial operation parameters, the personal safety drone can include various sensors required for flight, navigation, and orientation as would be appreciated by one of ordinary skill in the art. In some embodiments, this launch sequence can be pre-programmed into the personal safety drone, for example, programmed into memory during manufacture, or pushed into memory at some previous time by threat monitoring and response system 100. In this push configuration, threat monitoring and response system 100 can advantageously update the launch sequence as needed, to either optimize performance or comply with various laws and regulations governing drone usage.

In some embodiments, Subject 150*a* can use monitoring application 182 to program or otherwise configure the personal safety drone with a custom launch sequence as desired. For example, Subject 150*a* might input his height into monitoring application 182 and specify that the personal safety drone should launch to a position that is five feet above him and four feet in front of him and immediately begin streaming audiovisual data to a predetermined list of recipients (in addition to streaming audiovisual data to threat monitoring and response system 100). These predetermined recipients might include any Guardians paired with Subject 150*a*, a specific internet location specified by Subject 150*a* (e.g. a personal internet-connected storage address), or specific authorities selected by Subject 150*a*. In this manner, Subjects can program the personal safety drone to launch and immediately begin executing a program that provides them with the most reassurance for situations in which they expect they may need to launch the personal safety drone.

In some embodiments, the personal safety drone launch can cause automatic activation of monitoring application 182 on the computing device 180*a* associated with Subject 150*a*. For example, the personal safety drone might broadcast a pre-determined wireless signal that computing device 180*a* scans for in the background. Upon the detection of such a signal, monitoring application 182 can be transitioned to run as a foreground process of computing device 180*a*, i.e. it is launched. For example, in one embodiment the personal safety drone might use Bluetooth as the transmission protocol for this signal, such that monitoring application 182 need only scan for the Bluetooth device name associated with the personal safety drone—if this device name is detected, then monitoring application 182 can infer with reasonable confidence that the personal safety drone has been launched and can transition to running in the foreground of computing device 180*a*. Various other launch signals can be employed by the personal safety drone to trigger computing device 180*a* to launch monitoring application 182. For example, the personal safety drone could be configured to broadcast a specific and unique ultrasonic sequence that is detected at a microphone of computing device 180*a*.

In some embodiments, the personal safety drone may not be outfitted with a long-distance wireless communication interface compatible with cellular communication networks, WiFi networks, etc. Such wireless communication signals require relatively large amounts of power, which could be wasteful when trying to minimize power usage of the personal safety drone for purposes other than maintaining and controlling flight. As such, the personal safety drone may be outfitted only with a low-power and/or short-range wireless communication interface. Examples of widely used interfaces of this nature include Bluetooth and NFC, although of course the personal safety drone could implement its own communication protocol over a different portion of spectrum.

No matter which wireless communication protocol or signal is used, monitoring application 182 can be configured to detect and decode these transmissions from the personal safety drone and subsequently relay the transmission as needed over conventional, longer-range wireless networks such as the cellular or WiFi networks mentioned above. In some embodiments, monitoring application 182 may not decode the transmissions from the personal safety drone, but instead may act as a simple relay or repeater, exactly mirroring the data it receives. For example, when receiving streaming video data from the personal safety drone, monitoring application 182 may immediately re-transmit all received data to one or more of the threat detection and response system 100, suitable authorities, and suitable threat response resources 140. This relay configuration is not unique only to streaming data from the personal safety drone, but can instead be implemented to enable any and all communications to and from personal safety drone. Accordingly, this includes not only the relay of streaming data from the personal safety drone to the threat monitoring and response system 100, but also includes the relay of any commands (such as control commands or mission parameters) that are transmitted from threat monitoring and response system 100 to the personal safety drone.

The personal safety drone can be autonomous, semi-autonomous, or fully remotely operated. Of course, in instances of full remote operation, minimal latency between the personal safety drone and any remote communication partners is important in order to avoid faults or other operation errors or problems. Accordingly, it is often desirable to implement the personal safety drone as either semi-autonomous or fully autonomous. In a semi-autonomous configuration, the personal safety drone might be operable to execute basic controls and flight/operation patterns while a remote operator or agent can command additional operations. For example, a remote monitoring system configured to perform threat monitoring with one or more personal safety drones might comprise the threat monitoring and response system 100, might comprise one or more human command center agents, might comprise one or more processors and/or threat analysis systems providing on a mobile computing device of the Subject, or might comprise the monitoring application 182 executing on the mobile computing device 180a. In some embodiments, one or more of the aforementioned examples can work in conjunction to perform threat monitoring and analysis of monitoring data collected by the personal safety drone(s). This cooperative processing might involve separate portions of the monitoring data being analyzed separately, or might involve overlapping portions of the monitoring data being analyzed by multiple locations or systems for purposes of redundancy. In some embodiments, the personal safety drone might switch to an entirely local processing mode if it is unable to establish (or maintain) reliable communications with one or more remote monitoring systems such as threat monitoring and response system 100. In some scenarios, the local processing mode might further include threat analysis systems executing on the mobile computing device 180a of the Subject and/or the monitoring application 182, as both of these are normally within the same locality or vicinity of the personal safety drone.

In some embodiments, these additional commanded operations applied to the personal safety drone can comprise the selection or activation of various pre-programmed routines (or an adjustment to one of these pre-programmed routines), or might be an adjustment to an operational parameter of the drone outside of any pre-programmed routine(s). In general, such additional commanded operations often contain only adjustments or other higher level commands, rather than comprising lower-level and completely machine-readable flight commands suitable to directly control one or more hardware level components of the personal safety drone. Instead, the additional commanded operations can be received by a flight computer of the personal safety drone, which then translates them into the machine-readable flight commands suitable for each given component of the personal safety drone. For example, the personal safety drone can autonomously execute a default flight pattern hovering at a specified point relative to the user, while a remote agent can transmit additional a high-level operational command for the drone to change to a 'follow' mode and trail the user as he walks—the updated flight commands are not transmitted by the remote agent, but are instead generated by the onboard flight computer of the personal safety drone based on one or more pre-programmed routines corresponding to the 'follow' mode command.

Subject Interactions

In some embodiments, it can be desirable to provide a lightweight and user-friendly version of monitoring application 182, such that the Subject is able to quickly and easily identify all available options, and subsequently select the most appropriate or a desired option in a minimum amount of time or number of interactions with monitoring application 182. For example, in situations of duress or active threat, it can be critical that the Subject be able to quickly use monitoring application 182 (including in a discrete or hands-free fashion) to summon the appropriate assistance or response from both threat monitoring and response system 100 and the personal safety drone. In a particular example, it is contemplated that home screen of the monitoring application 182 presents only two options 'Contact a Trusted Individual' and 'Request Command Center Assistance', which are discussed in turn below.

Selection of the 'Contact a Trusted Individual' option causes monitoring application 182 to present five further options to the Subject (although additional options may also be presented without departing from the scope of the present disclosure): 1) Tune to Me 2) Call me 3) Video Call Me 4) Pick Me Up and 5) Call Emergency Services. These five further options are briefly discussed below, and generally contemplate certain interactions between the Subject and one or more individuals that the Subject has designated as a trusted individual. The trusted individuals can include one or more Guardians of the Subject, although non-Guardians can also be included in a Subject's trusted individuals list. For example, trusted individuals might be a parent, a friend, a spouse, a son or daughter, a sibling, a family member, a co-worker or boss, etc. In some instances, a user can register multiple trusted individuals with the monitoring application.

1) Tune to Me

When this option is selected, a notification is automatically generated and transmitted to one or more trusted individuals in order to allow each trusted individual to monitor the Subject's current location and/or status. In some embodiments, the notification can be automatically transmitted to all of the registered trusted individuals associated with the Subject, although it is also possible that the notification is only transmitted to a portion of the registered trusted individuals. This portion might be manually selected by the Subject, or can be automatically determined, e.g. the notification may be transmitted only to trusted individuals within some specified radius of the Subject's location (e.g. 50 miles, 100 miles), trusted individuals in the same country, etc., although other selection criteria are also possible without departing from the scope of the present disclosure.

The notification can comprise a Subject identifier or name, a location indicator of the Subject, a message from the Subject, telemetry data associated with the Subject, a time-stamp indicating when each piece of data was most recently collected or obtained, etc. In some embodiments, the location indicator can be a GUI or visual display of a map overlaid with the current location of the Subject, which can be obtained as a GPS-determined location of the Subject's mobile phone or mobile computing device (such as mobile computing device 180a of Subject 150a), a nearby WiFi access point location, a cellular tower triangulated location of the Subject's mobile phone or mobile computing device, etc. This notification can be updated in real-time or at a pre-defined interval. In some embodiments, the notification can be updated in a push fashion, wherein an updated notification is transmitted to each selected trusted individual in response to newly available location and/or status information corresponding to the Subject.

The trusted individual can receive the notification in his own copy of a monitoring application (which might be substantially similar to monitoring application 182). The trusted individual's monitoring application could run as mobile application, a desktop application, a web application, or some other GUI-based application. Upon receiving the notification, the trusted individual is presented with a prompt to confirm or acknowledge the notification, e.g. by pressing an 'Acknowledge' button presented by the monitoring application. This acknowledgement will be transmitted from the trusted individual back to the Subject, such that an acknowledgement notification is presented on the monitoring application of the Subject (e.g. reading "I see you"). The Subject location, Subject status, and Subject messages can be continuously updated and transmitted to the trusted individuals until the Subject elects to terminate the communication, thereby providing the Subject with reassurance that he is being actively monitored by his selected trusted individuals, who will take appropriate action if they notice something amiss.

2) Call Me

The 'Call Me' option prompts the trusted individual to place a call to the Subject, e.g. by dialing the phone number associated with the Subject's mobile computing device (such as mobile computing device 180a of Subject 150a). This option can be taken in isolation, or in addition to another option such as the 'Tune to Me' option, in which case the trusted individual will both place a phone call to the Subject's mobile computing device while also receiving location and status information from the Subject.

3) Video Call Me

The 'Video Call Me' option is similar to the 'Call Me' option described above, but employs a video call data stream in addition to an audio stream. In some embodiments, the video call might be one-way, e.g. only the Subject transmits video to the trusted individual, or only the trusted individual transmits data to the Subject. In some embodiments, the video call might be two-way, such that the Subject and the trusted individual both transmit and receive video call data.

4) Pick Me Up

The 'Pick Me Up' option prompts the trusted individual to either directly or indirectly assist in transporting the Subject away from his or her current location. For example, the trusted individual may receive a location indicator of the Subject (or can receive the notification described with respect to the 'Tune to Me' option) with an additional selectable option to navigate to the Subject. This option can then automatically place the mobile computing device of the trusted individual into a navigational mode, such that the trusted individual can use his own vehicle to go pick up the Subject. Alternatively, the trusted individual may utilize a selectable option to request a third-party pickup service for the Subject. In this manner, the trusted individual can arrange the service, handling logistics and payment, in situations wherein the Subject himself may be too preoccupied to arrange the third-party pickup service.

5) Call Emergency Services

The 'Call Emergency Services' option prompts the trusted individual to contact one or more emergency services on behalf of the Subject. The trusted individual might receive a location indicator of the Subject (or can receive the notification described with respect to the 'Tune to Me' option), which can be passed along to the appropriate emergency services as needed when the trusted individual works to explain the scenario to the emergency services and coordinate their response to the current location of the Subject. The emergency services can include, but are not limited to, 911, fire departments, police departments, EMTs, EMS, third-party agencies, threat response resources 140, etc.

In some instances, instead of contacting a trusted individual via one of the options above, a Subject may instead opt to contact a command center to request assistance. These command centers can include one or more of GIC 110, GCC 120, and RCC 130, generally referred to herein as threat monitoring and response system 100. Upon selecting the option to request command center assistance, monitoring application 182 presents the Subject with a total of six further options (although additional options may also be presented without departing from the scope of the present disclosure): 1) Tune to Me 2) Call me 3) Video Call Me 4) Pick Me Up 5) Call Emergency Services and 6) Send a Drone. Note that the first five options are the generally the same as the five further options discussed above with respect to the 'Contact a Trusted Individual' option, although here the Subject location and/or status information would be transmitted to the threat monitoring and response system 100. In some embodiments, one or more agents at the threat monitoring and response system 100 can take the role of the trusted individual described above, such that in many instances, the trusted individual and the threat monitoring and response system 100 can provide the same or a substantially similar response for each of these five options. However, it is noted that a new, sixth option—'Send a Drone'—is presented.

1) Tune to Me

Upon selecting the 'Tune to Me' option, the Subject location and/or Subject status information is transmitted to threat monitoring and response system 100. In some embodiments, threat monitoring and response system 100 may receive Subject location and/or status information on a real-time basis, making this transmission redundant. In some embodiments, the Subject location and/or Subject status information might be transmitted to threat monitoring and response system 100 in response to the Subject selecting the option to request command center assistance, prior to the Subject's selection of a specific one of the six further options discussed herein. In some embodiments, threat monitoring and response system 100 might combine the monitoring data received from the Subject with Subject profile information stored in one or more associated databases (such as database 112 of FIG. 1), such that threat monitoring and response system 100 or a command center agent is able to augment the suitable threat response with other relevant Subject information. Relevant Subject information can include, but is not limited to, age, gender, medical conditions, medical history, medications taken, movement and location history, home address, etc.

The 'Tune to Me' request might be routed to a most appropriate or relevant command center, e.g. based on proximity to the Subject's location. In some embodiments, the 'Tune to Me' request might be routed to a regional command center such as RCC 130 where one or more command center agents or command center resources have specific regional experience and expertise that pertains to a determined region of the Subject's current location. This regional experience and expertise might be as broad as the language spoken, or might be more fine-grained, such as having detailed knowledge of un-mapped roads, paths, and routes in the region.

2) Call Me

The 'Call Me' option will cause threat monitoring and response system 100 or a command center agent to immediately place a call to the requesting Subject. Such a call can enable further interaction, allowing the requesting Subject to explain her current predicament or make a further request of the command center agent. The command center agent can also interact with the requesting Subject to offer advice, instructions, or to obtain further information.

3) Video Call Me

The 'Video Call Me' option causes one or more mobile computing devices associated with the Subject (such as mobile computing device 180*a* of Subject 150*a*) to capture and stream video call data to threat monitoring and response system 100 or a command center agent. In some embodiments, other external video recording devices associated with the Subject or associated with threat monitoring and response system 100 may be used in lieu of or in addition to the Subject's own mobile computing device. This streamed video call data permits the command center agent to monitor, or otherwise analyze the situation that caused the Subject to feel uncomfortable or threatened, and appropriate action can thus be taken more effectively on the basis of this streamed video data. In some embodiments, the 'Video Call Me' option can be controlled by the command center agent to provide a threat response.

For example, video data of the command center agent (e.g. shoulder-up video of the agent's face) can be streamed to a display of the Subject's mobile computing device, which the Subject can then present to a threatening individual. In this manner, the threatening individual can be deterred, e.g. by the command center agent commanding "Sir, please step away; you are being video recorded and the authorities are being contacted". In some embodiments, the display of the Subject's mobile computing device may additionally or intermittently strobe or flash blue and white, which can further act to deter the threatening individual.

4) Pick Me Up

The 'Pick Me Up' option can cause the command center agent to quickly view a listing or indication of all available transportation resources, vehicular or otherwise, that can be provided to the requesting Subject in order to remove the Subject from a threatening or uncomfortable situation, or to remove the Subject from his current location. This option can be valuable in instances wherein a Subject feels to uncomfortable or threatened to order a pickup or transportation service himself; or in situations where the Subject is otherwise incapacitated and unable to do so himself. In addition to third-party pickup and transportation resources which can be hired on a contract basis by threat monitoring and response system 100 to pick up the requesting Subject, threat monitoring and response system 100 can additionally maintain a fleet of its own pickup and transportation resources, some of which may be integrated with the data feeds and analysis from threat monitoring and response system 100 in order to thereby provide a faster response in comparison to third-party services (e.g. because at least one layer of dispatch and communication of the vehicle is eliminated by using the threat monitoring and response system 100 fleet rather than the third-party services). After coordinating the pickup, threat monitoring and response system 100 and/or a command center agent can continue to monitor the ride (and/or the location and status of the requesting Subject) until it is determined that the requesting Subject has arrived at home or has canceled the monitoring request.

5) Contact Emergency Services

The 'Contact Emergency Services' option can function in the same manner that was described above with respect to the trusted individual. However, in some embodiments threat monitoring and response system 100 can integrate or communicatively couple with one or more dispatching systems of the emergency services, such that the relevant information of the emergency or threat confronting the Subject can be provided to the emergency services in an expedited manner, and no human intermediate or dispatcher is needed. Further still, threat monitoring and response system 100 might further continue to stream or otherwise transmit updated Subject location and/or status information to the emergency services as they navigate to the Subject and provide their emergency response.

In some embodiments, the 'Contact Emergency Services' option can function such that monitoring application 182 directly connects the Subject to emergency services, without the request being routed to threat monitoring and response system 100 or without the involvement of a command center agent in coordinating or placing the call to emergency services. In this manner, the Subject can be provided with an immediate connection to make their request to emergency services. However, it can still be possible that the Subject selection of 'Contact Emergency Services' will notify threat monitoring and response system 100 and/or a command center agent, such that the call between the Subject and the emergency services can be monitored as needed. For example, this monitoring could be passive, wherein threat monitoring and response system 100 and/or the command center agent merely become a third party to the call for purposes of listening to understand the situation and extract other relevant information. In other scenarios, the monitoring could be active, wherein threat monitoring and response system 100 and/or the command center agent are a third party to the call and offer advice, assistance, input or otherwise act to assist in coordinating one or more emergency services response or threat responses.

6) Send a Drone

The 'Send a Drone' option can locate, select, and deploy one or more drones to assist the requesting Subject. These drones include personal safety drones such as those described above, which may be stored on or near the person of the Subject, or are otherwise stored somewhere in the near vicinity of the Subject. Other drones might be part of a distributed network of drones, installed at various locations around a region an awaiting activation and deployment (such as the area safety drones discussed later in this disclosure). In some embodiments, the drones might perform active patrols while awaiting a specific deployment to a requesting Subject, wherein the drones provide video and other monitoring data to the command center while performing their active patrols.

In order to provide a rapid response to Subjects selecting the 'Send a Drone' option, threat monitoring and response system can provide a plurality of drones in a regional network capable of providing a 2 minute response time to 95% of Subjects or 95% of locations, or capable of providing a 2 minute response time to some pre-defined coverage area or coverage range of the region. The drones can be provided with a suitably sized battery or other energy reserve such that the drone has a range of at least 3 miles in forward flight and can hover for at least 30 minutes.

The drone can be autonomously, semi-autonomously, or remotely navigated to the current location of the Subject (or to the last known location of the Subject). In some embodiments, the drone can carry a payload comprising a flash light, a speaker/megaphone, and one or more video cameras and sensor arrays, although other payload components are possible without departing from the scope of the present disclosure. Video or image data from the one or more video cameras can be used to better locate the requesting Subject once the drone has navigated to the general area defined by the current location of the Subject as received by the command center. For example, computer vision and one or more known characteristics of the requesting Subject (e.g. height, sex, hair color, eye color, reference images, etc.) can be utilized in combination such that the drone can recognize the requesting Subject in the scene captured by its video cameras and subsequently navigate to a desired position relative to the requesting Subject. In particular, the drone might be pre-configured with an identifying image data associated with the requesting Subject in order to allow the computer vision and/or facial recognition systems of the drone to more accurately locate and track to the Subject. This pre-configuration might be done as a registration process that pairs the Subject to a personal safety drone, or a registration process that involves the Subject providing identifying image data to the threat monitoring and response system 100 such that this identifying image data can then be forwarded to drones attempting to locate and identify the Subject. In still further embodiments, the pre-configuration process of providing the drone with identifying image data of the Subject might be carried out via the monitoring application 182 and/or one or more cameras of the Subject's mobile computing device 180a. Once the requesting Subject has been located, the drone can then operate in a manner similar to that which has been described above with respect to the personal safety drone, e.g. flying to a position 2 feet in front of and 3 feet above the Subject's head, following the Subject and maintaining this same separation if or when the Subject begins to walk, run or otherwise move, and performing any further actions either commanded by the Subject, by the threat monitoring and response system 100, by the monitoring application 182, or autonomously determined by one or more onboard processors of the drone. In some embodiments, the drone might only be equipped with a facial detection system, i.e. locate facial data in a given image frame, such that the drone can transmit this anonymous facial data to the threat monitoring and response system 100 and/or the monitoring application 182, which may be better equipped to handle the relatively processor-intensive task of performing facial recognition on the anonymous facial data detected by the drone.

Although the example above is made with respect to a scenario in which a single drone is deployed to the Subject's location, it is also possible that multiple drones (of a similar design or a differing design; deployed from the same location or from different locations) can be deployed to assist the Subject. Such a multi-drone deployment can be advantageous in providing flexibility and redundancy to the threat response. For example, if a first drone loses sight of the Subject or is otherwise no longer able to track the Subject, a second or third drone that were also deployed will likely still be able to maintain tracking contact with the Subject, thereby ensuring an uninterrupted threat response and communication channel between the Subject and threat monitoring and response system 100. Additionally, the use of multiple drones can provide multiple angles for video capture or other sensor data capture, which can permit an enhanced situational or threat analysis of the situation confronting the Subject. Further still, multiple drones can communicate amongst themselves to coordinate their threat response, such that the multiple different drones can cooperatively work as a single, distributed unit.

In instances where the requesting Subject was only feeling uncomfortable (e.g. walking home alone in a dark park), the drone can escort the Subject home, providing services such as illumination and video monitoring for obstacles ahead in the darkness. If the requesting Subject is facing an active threat (e.g. an attempted mugging), then the drone can provide an active deterrent to the mugger, flashing bright lights and using a speaker/megaphone to provide verbal warnings and commands to cease the threatening activity.

In some embodiments, the selection of the 'Send a Drone' option will also automatically trigger the 'Call Me' option, such that the Subject can verbally communicate with threat monitoring and response system 100 and/or a command center agent while the drone is inbound to the Subject's location. This verbal communication can be used for the command center agent to obtain additional information, which can be relayed to the inbound drone, used to deploy other drones, used to trigger other threat responses or active other threat response resources, etc. In addition, the verbal communication can provide reassurance and guidance to the Subject while he waits for the drone to arrive, which can prove invaluable to Subjects under duress or in threatening situations.

Figure 2A:
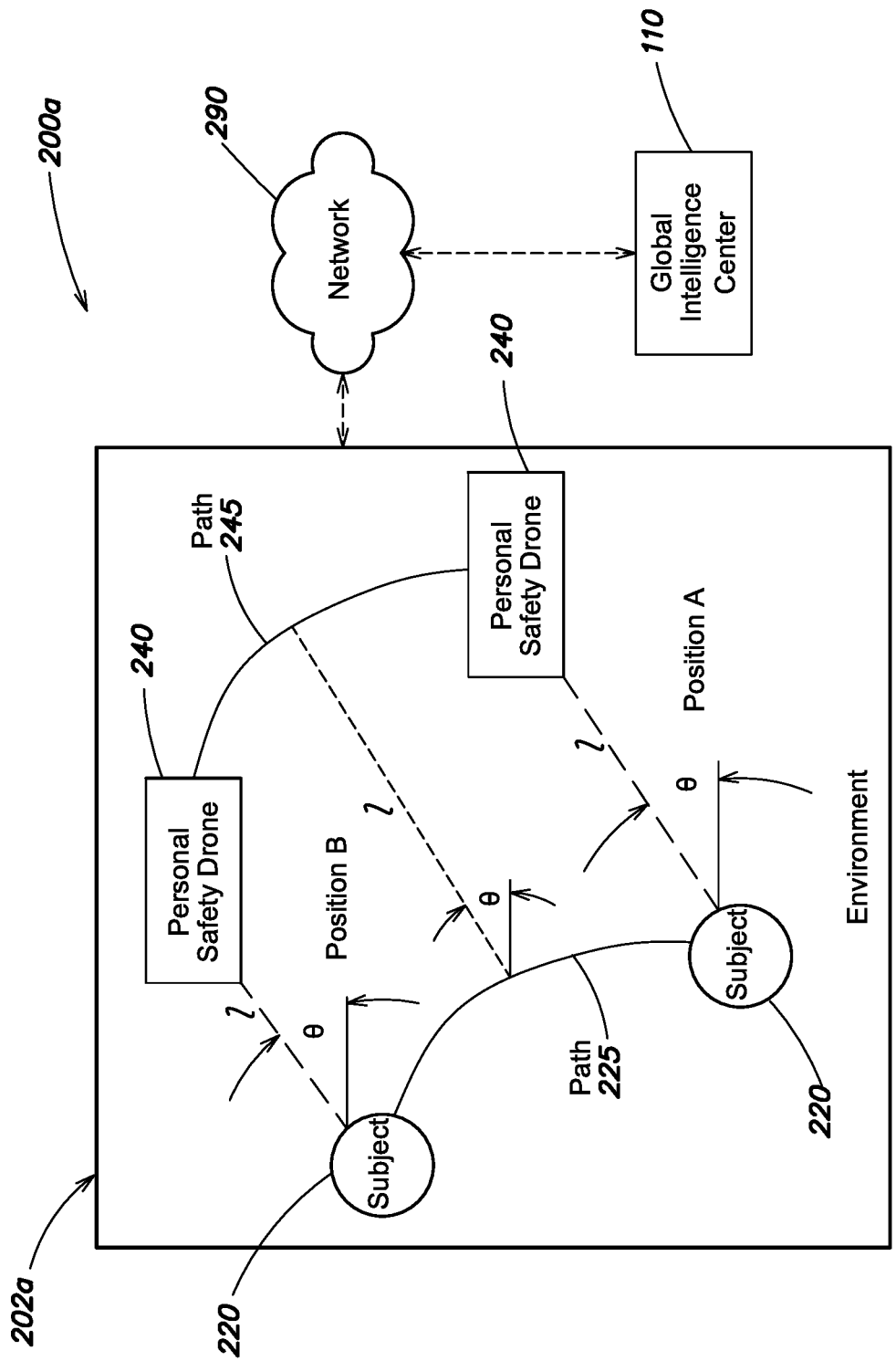
FIG. 2A depicts an example environment and an interaction with a personal safety drone.
Figure 2B:
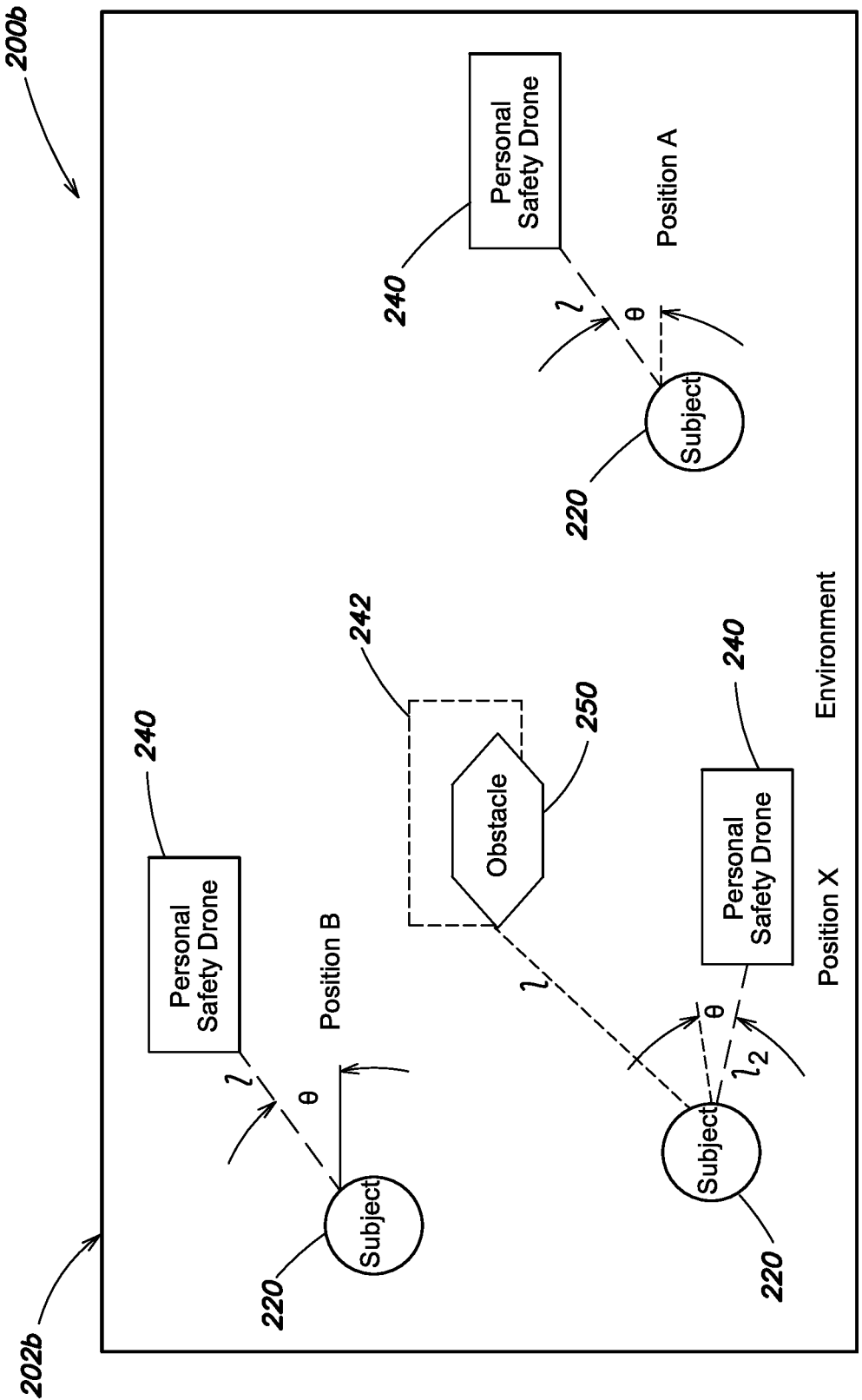
FIG. 2B depicts an example environment with an obstacle and an interaction with a personal safety drone.
Figure 2C:
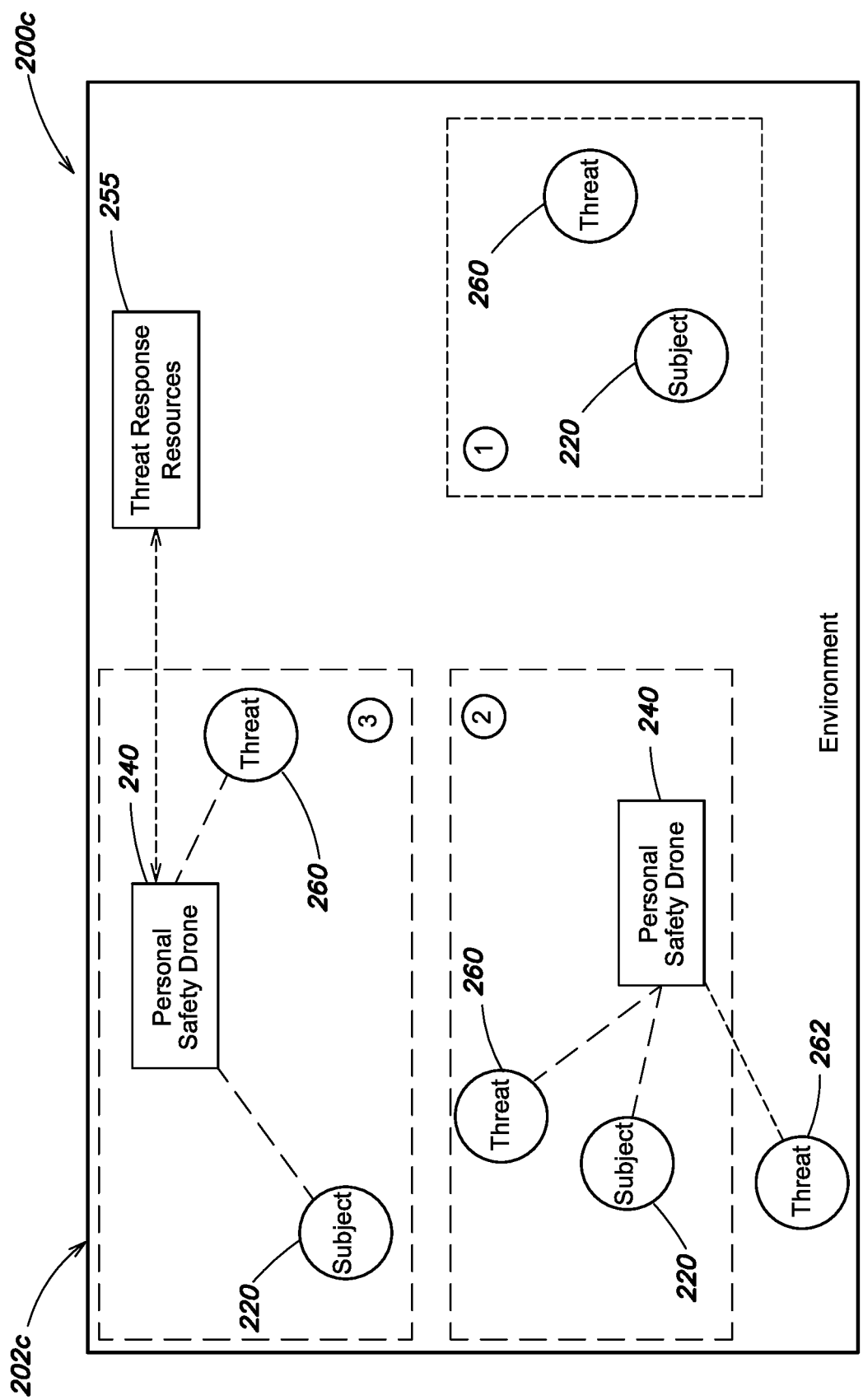
FIG. 2C depicts an example environment and an interaction between a personal safety drone and a threat.
Figure 3B:
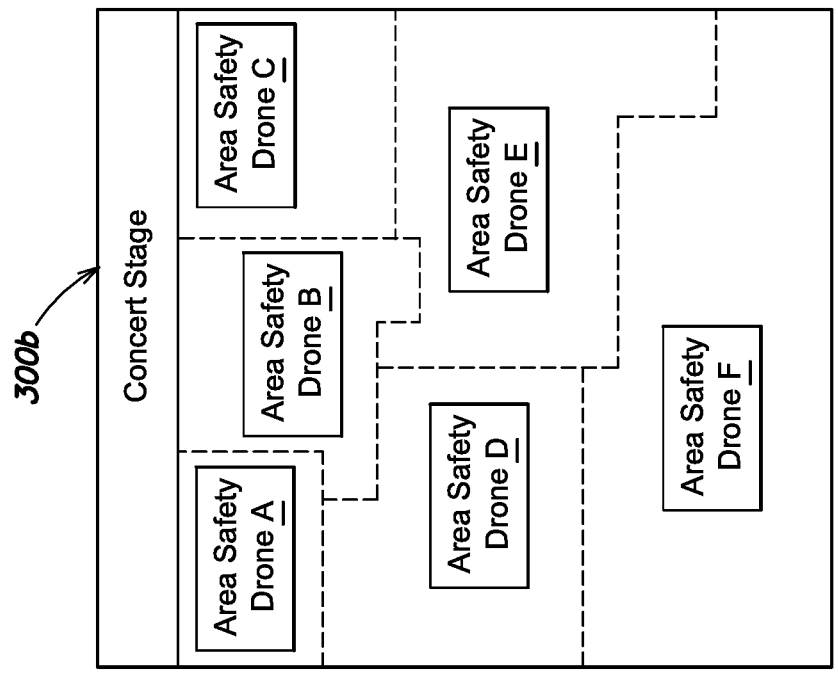
FIG. 3B depicts a second example area safety drone deployment.
Figure 3A:
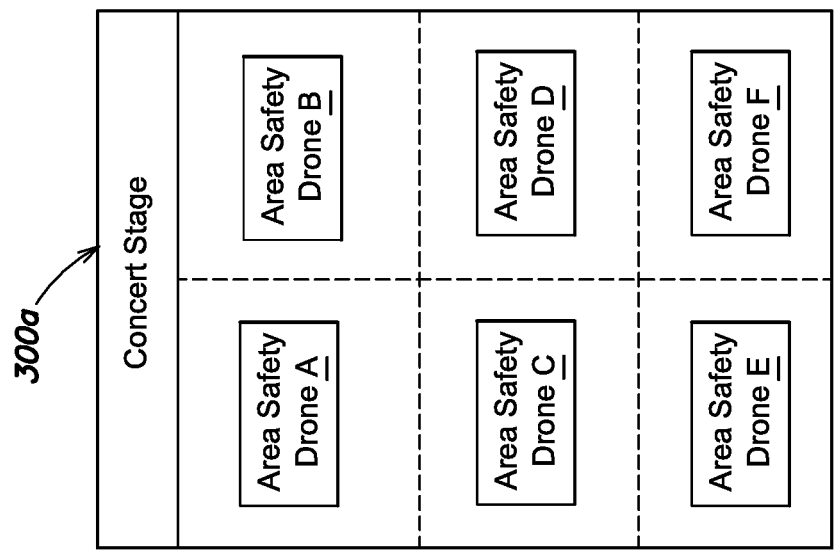
FIG. 3A depicts a first example area safety drone deployment.
Figure 3C:
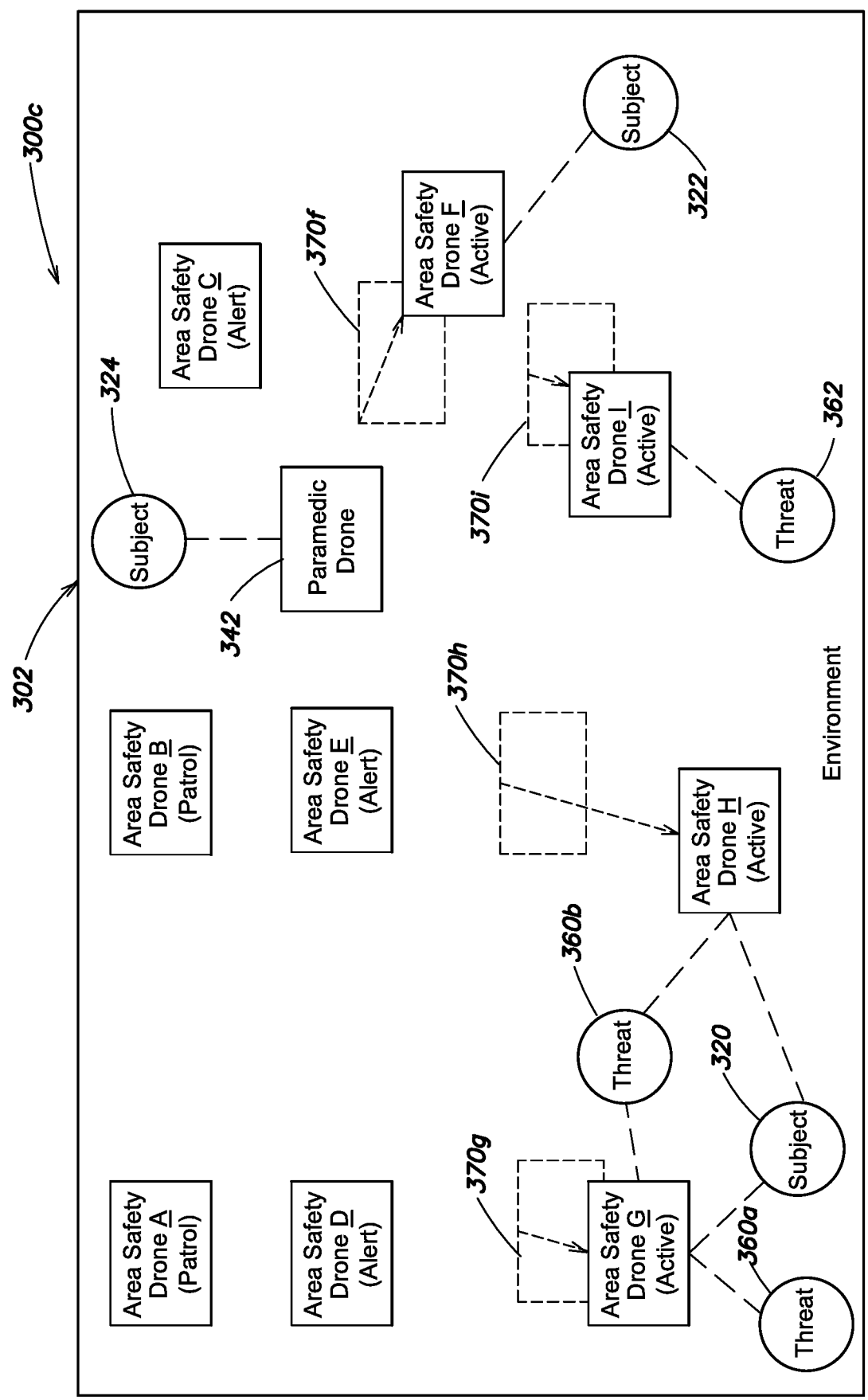
FIG. 3C depicts an example deployment of a fleet of area safety drones in an environment with multiple ongoing threats.

The disclosure turns now to FIGS. 2A-2C, which depict various scenarios and interactions involving Subjects and personal safety drones. FIGS. 3A-C depict various scenarios and interactions involving Subjects and area safety drones. In the scenario depicted in FIG. 2A, no explicit threat is present. Instead, personal safety drone 240 has been deployed for purposes of active/proactive monitoring, e.g. because Subject 220 feels uncomfortable in the current environment 202a rather than directly threatened. In this case, Subject 220 will often times be moving, e.g. continuing on his walk or bike ride through environment 202a, meaning that it is necessary that personal safety drone 240 follow Subject 220. In particular, the movement of Subject 220 is shown in the form of a path 225 between Position A and Position B, while the movement of personal safety drone 240 is shown in the form of a path 245, also between Position A and Position B. Note that paths 225 and 245 have the same curvature and shape but are offset by the distance/ such that the desired fixed separation between Subject 220 and personal safety drone 240 is maintained over the entire course of movement, as is the angle θ between Subject 220 and personal safety drone 240.

In this manner, personal safety drone 240 can be configured to trail Subject 220 such that personal safety drone 240 remains in the same fixed position relative to Subject 220 even when Subject 220 is moving. This can be particularly advantageous in providing stable and useful video or other monitoring data collected by personal safety drone 240 for transmission to GIC 110 or other portions of threat monitoring and response system 100. In some embodiments, personal safety drone 240 can be programmed such that one or more of the parameters l and θ vary with time, with the movement of Subject 220, or both. For example, personal safety drone 240 might be programmed to always maintain a fixed separation l but vary θ such that a 360 degree rotation around the Subject is performed every 30 seconds (drone position varying with time) or is performed for every 500 feet traveled by the Subject (drone position varying with movement of Subject). Furthermore, although the depiction of FIG. 2A is a two-dimensional view, it is understood that the positioning and control of personal safety drone 240 relative to Subject 220 can be executed with respect to three dimensional parameters if so desired.

This 'trail' or 'follow' functionality can be implemented locally on the personal safety drone, i.e. in autonomous fashion independent from any control signals that may be transmitted by threat monitoring and response system 100. In some embodiments, the 'trail' functionality can be implemented by using machine vision to localize Subject 220 in the video frames captured by an onboard camera of the personal safety drone 240, such that the drone can thereby maintain a fixed or commanded positioning between itself and the Subject. Due to the latency and complexity of transmitting this video data from the personal safety drone 240 to GIC 110 for processing into control commands, it is contemplated that in some embodiments that an autonomous and/or machine-vision based navigation and obstacle avoidance system is implemented locally at one or more onboard processors of the personal safety drone 240.

In addition to onboard cameras, one or more laser or optical distance sensors could be provided on personal safety drone 240 such that various distance measurements can be obtained, thereby permitting the personal safety drone 240 to determine its position relative to Subject 220. In some embodiments, these one or more distance sensors could be combined with a machine vision system running on personal safety drone 240, thereby greatly reducing the computational load incurred by the drone as compared to the scenario in which the drone must perform pure machine vision without additional supplementary data inputs. Distance measurements are useful for many purposes onboard the personal safety drone 240, which in addition to those described above, can further include without limitation: navigation, obstacle avoidance, Subject localization, target acquisition, takeoff/landing, etc.

In some embodiments, a beacon can be carried on or near the person of Subject 220, integrated within the carrying case of personal safety drone 240, or both. This beacon can be passive (e.g. a reflector) or active (a wireless transmitter), such that it is quickly and easily detectable by personal safety drone 240 through one or more of its onboard cameras or sensors. For example, a passive beacon could be tuned to reflect a swept laser beam emitted from personal safety drone 240. Taken in combination with multiple measurements and/or a round trip time of the laser beam, the beacon can be located relative to personal safety drone 240. As an example of an active beacon, the beacon might be a tuned radio frequency emitter that personal safety drone 240 can measure using several corresponding radio receivers to thereby triangulate the location of the beacon, and therefore, determine the relative positioning between itself (the drone) and Subject 220. Conversely, several beacons might be provided which can allow for triangulation using a single corresponding onboard radio receiver of personal safety drone 240. Because the utmost precision may not be required to trail Subject 220 (e.g. it is important to generally locate the Subject so that he may be followed, but an error of approximately half a foot might be easily tolerable), it may be sufficient to simply locate the beacon and treat that as the location of Subject 220. Alternatively, a pre-determined offset between the beacon and Subject 220 could be utilized to calculate the Subject's location, or the offset between the beacon and Subject 220 could be a parameter that is input into monitoring application 182 by Subject 220.

In some embodiments, personal safety drone 240 may be able to automatically and dynamically update one or more of its operational parameters in order to provide continued execution of a desired routine, such as the user tracking routine described above. In many environments, and particular those environments in which personal safety drone 240 is operating in a reactive sense (i.e. exploring and sensing the environment on the fly rather than consulting a pre-existing map of the environment), one or more obstacles may cause the personal safety drone 240 to temporarily lose sight of the Subject or other object being tracked. For example, personal safety drone 240 may have to fly to temporarily higher altitude in order to avoid tree branches, or the personal, or the personal safety drone 240 may track the Subject to a building that the drone is unable to enter (e.g. the personal safety drone 240 might be banned from operation in public or private indoor spaces such as malls and businesses). In such instances, personal safety drone 240 can initiate one or more updated operational parameters and/or configured actions in order to relocate the Subject or otherwise alert threat monitoring and response system 100 that the Subject has been lost and an appropriate action needs to be taken. These actions to reacquire the Subject or object being tracked can be performed autonomously onboard personal safety drone 240, even if the drone was most recently being operated in a semi-autonomous or remote fashion.

While personal safety drone 240 can be configured to autonomously or semi-autonomously perform the above described following or trailing functionality with respect to the position and movement of Subject 220, there are various instances wherein an override of personal safety drone 240's current navigational course can be necessary (e.g. to avoid a collision or to maintain compliance with laws and safety regulations) or otherwise commanded (e.g. by Subject 220 or by threat monitoring and response system 100).

In the case of an override or deviation from personal safety drone 240's present or planned navigational course, it is contemplated that personal safety drone 240 can be configured with one or more safety precautions in order to comply with local laws and regulations and/or to protect from malfunctions or catastrophes. For example, personal safety drone 240 can be configured with a collision avoidance system (which may employ one or more of the same payload sensors used by personal safety drone 240 to also capture monitoring data for threat monitoring and response system 100) which is operative to prevent personal safety drone 240 from colliding with obstacles such as trees, poles, signs, lamps, etc. This collision avoidance system can take precedence over all other commanded operations of personal safety drone 240, as a drone that is destroyed in a collision can no longer function as desired. In some embodiments, the collision avoidance system can be implemented using computer vision or artificial intelligence, executed at one or more on-board processors of the personal safety drone 240. In some embodiments, at least a portion of this processing burden can be off-loaded from the personal safety drone 240 to some remote computing device, which for example might be GIC 110 of threat monitoring and response system 100. In some embodiments, the machine learning system 117 of GIC 110 can be utilized to train one or more neural networks or other machine learning (ML) algorithms to provide a collision avoidance system for personal safety drones, such that the training process is carried out at GIC 110 and the trained ML collision avoidance system is then loaded onto personal safety drone 240 for use. In this manner, although personal safety drone 240 must still perform the requisite onboard processing to support the instantaneous operation of the trained ML collision avoidance system, the personal safety drone 240 avoids performing the training process itself, which comprises the vast majority of the computational workload underlying such an ML collision avoidance system.

In operation, if personal safety drone 240 is performing a standard monitoring operation and maintaining a fixed position relative to Subject 220, as illustrated in FIG. 2A, it can often be required that personal safety drone 240 temporarily deviate from this fixed relative positioning in order to avoid a low-hanging tree branch or a street sign. The collision avoidance system (machine learning based or otherwise) can detect the object in advance (e.g. using machine vision, distance sensing, radar, LIDAR, etc.), calculate an adjusted path to avoid the obstacle, and upon successfully avoiding the obstacle, calculate a new path that will return personal safety drone 240 to the desired fixed positioning relative to Subject 220 (or more generally, return personal safety drone 240 to its previously commanded operational path).

As a further example, consider FIG. 2B, which is similar to FIG. 2A but introduces an obstacle 250 between Position A and Position B. As mentioned above, obstacle 250 might be a tree, a pole, a sign, a street lamp, or any other object in environment 202b which could impede or otherwise interfere with the flight or movement of personal safety drone 240. Note that obstacle 250 does not necessarily need to be physical, as areas of strong RF interference may also be classified as obstacles due to the interruption they cause in data transmission to and from personal safety drone 240. Regardless of the particular type of obstacle 250, it is desirable that personal safety drone 240 avoid taking a path that will collide or otherwise intersect/overlap with obstacle 250. In the case of FIG. 2B, if personal safety drone 240 were to maintain the same relative positioning with respect to Subject 220 (i.e. the distance l and angle θ defined by Position A), then in an intermediate Position X, the personal safety drone 240 would collide with obstacle 250 as indicated by the dotted box 242 representing the position of personal safety drone 240 if the relative positioning given by l and θ is maintained.

Instead, personal safety drone 240 detects obstacle 250 and calculates an adjusted path to avoid obstacle 250. This adjusted path takes a higher precedence than the previous path between Position A and Position B, and causes personal safety drone 240 to enter a new relative positioning relative to Subject 220, shown here as a shorter distance $l_2$ and a smaller angle $\theta_2$ at Position X. This adjusted path and new relative positioning can be calculated such that a sufficient margin of safety is satisfied (e.g. a sufficient clearance distance or minimum approach distance between personal safety drone 240 and obstacle 250). Once obstacle 250 has been successfully avoided, personal safety drone 240 can exit the collision and obstacle avoidance routine and return to following Subject 220 at the previous relative configuration defined by distance l and angle θ, as seen in Position B.

In addition to the collision avoidance system, personal safety drone 240 can also be provided with a power-down procedure to handle scenarios in which the drone depletes its battery power while still in flight. Normally, personal safety drone 240 can be deactivated by Subject 220 (e.g. initiating a 'land' command via monitoring application 182, uttering a verbal 'land' command received by a microphone on personal safety drone 240, or performing a 'land' gesture captured by a camera on personal safety drone 240), although it is also possible for personal safety drone 240 to be deactivated by threat monitoring and response system 100. However, in some instances personal safety drone 240 may run out of battery power before its current operational task is completed, or before a 'land' command is received. Without a power-down procedure, personal safety drone 240 would simply fall out of the air at the point in time when its batteries became fully depleted, causing a potentially dangerous collision with Subject 220 and/or a potentially dangerous impact with the ground. Accordingly, the power-down procedure can monitor the battery level of personal safety drone 240 and initiate a safe shutdown at a pre-defined battery level threshold that is prior to full battery depletion. A safe shutdown can include a notification that the shutdown is beginning, e.g. an audible alert to Subject 220, a notification to monitoring application 182 of the Subject's computing device, a notification to threat monitoring and response system 100, etc. After the notification, personal safety drone 240 can select a safe landing location and execute a landing procedure and then a power down, at which point Subject 220 can retrieve personal safety drone 240 and stow it for charging or transportation.

In some scenarios, an ongoing threat may be deemed of sufficient severity that personal safety drone 240 needs to remain operational as long as possible. This sufficient severity trigger can be determined by a calculation or command received from threat monitoring and response system 100, a calculation or command determined by an onboard processor of the personal safety drone 240, or by a verbal override from Subject 220. For example, if personal safety drone 240 is monitoring an ongoing crime when the pre-defined battery level threshold is reached, personal safety drone 240 may instead maneuver to a safe height and/or separation from Subject 220 such that personal safety drone 240 will not cause bodily harm to the subject when its batteries fully deplete and the drone drops from the air. Alternatively, personal safety drone 240 can enter a power-saving mode, which could turn off un-needed sensors, reduce rotor/lift performance, or even eject components deemed unnecessary at the moment. Further still, personal safety drone 240 could locate a safe landing spot that maintains an adequate vantage point of Subject 220 and the ongoing crime, such that personal safety drone 240 conserves power by deactivating its flight system while still continuing to capture and stream video data from its static vantage point. Additionally, personal safety drone 240 could be equipped with an emergency battery supply to be activated only in such situations of extreme duress or threat. Through these collision avoidance and safe shutdown routines, the need for safe operation of personal safety drone 240 can be balanced with the need to protect Subject 220 and fulfill other important mission criteria, such that the severity of any threat is weighed against these otherwise over-riding routines meant to protect personal safety drone 240 from damage or destruction.

In the case of a commanded override to the navigational course or routine being executed by personal safety drone 240, such a commanded override can originate with Subject 220 or with threat monitoring and response system 100. For example, in some embodiments personal safety drone 240 can be outfitted with a navigational command system that receives one or more natural language commands from Subject 220 and translates them into the electrical control signals and navigational path objects required to actually control and operate personal safety drone 240. For example, Subject 220 could say 'follow me from in front' or 'fly above me and sweep the light ahead of me'. While conventional voice recognition techniques can translate the received speech into text, personal safety drone 240 preferably does more than implement a dictionary of stored phrases and their corresponding control actions, because what must be gauged is the intent of Subject 220's command, rather the literal phrasing of the command. In other words, there are numerous natural language constructions that can be employed to communicate the two commands above, e.g. 'follow me from in front' could be alternately be phrased as 'fly ahead of me' and 'fly above me and sweep the light ahead of me' could be alternately phrased as 'go up and light the path in front of me'. As such, either personal safety drone 240 or the threat monitoring and response system 100 can be equipped to parse the meaning behind command phrases in order to execute a suitable and responsive control of the drone. In instances where this parsing is performed by threat monitoring and response system 100, Machine Learning system 117 of GIC 110 and/or a content classification system can be employed in combination to better tailor the drone control outputs that are generated from received Subject commands.

Additionally, it is noted that the received Subject commands need not be verbal. For example, they could be gesture based, wherein specific hand movements and combinations of hand movements can indicate a desired control command of the drone, including any of the example commands described above. Regardless of the medium used by Subject 220 to convey desired control commands, personal safety drone 240 can be equipped with one or more suitable sensors to capture the command such that either the drone itself or threat monitoring and response system 100 can interpret and implement the command accordingly.

In the case of a commanded override to personal safety drone 240 originating with threat monitoring and response system 100, consider again the earlier scenario wherein Subject 220 configures personal safety drone 240 to launch and automatically enter a hover at Position A. These operations are performed (and maintained) autonomously until an override or additional command is received from threat monitoring and response system 100. These override or additional commands can be transmitted from threat monitoring and response system 100 based on a real-time or dynamic threat analysis and evaluation, performed on the basis of both existing information (e.g. normal system operation prior to the launch of personal safety drone 240) and on the basis of new information provided by personal safety drone 240 (e.g. through its visible light camera, infrared camera, microphone, etc.). Because threat monitoring and response system 100 is a far more sophisticated computational resource and is not subject to battery power requirements like personal safety drone 240, it can be advantageous for the drone to simply stream raw captured data to offload the computational expense of its analysis to the threat monitoring and response system 100 and then simply await a command determined by the system 100.

For example, FIG. 2C illustrates an example scenario in which a Subject 220 encounters a threat 260, which might be another human (e.g. an individual threatening to rob Subject 220) or an environmental factor (e.g. an aggressive dog confronting Subject 220). In a first step, threat 260 approaches Subject 220. The threat 260 can be identified by Subject 220 or by threat monitoring and response system 100, although it is noted that in this first step a personal safety drone 240 has not yet been deployed. In the context of the present example, Subject 220 visually identifies and ascertains threat 260, and in response, launches or otherwise deploys personal safety drone 240 to monitor the situation, capture audiovisual data to update threat monitoring and response system 100, and create a record in case the situation with threat 260 deteriorates. For example, Subject 220 can launch or deploy personal safety drone 240 by actuating one or more physical buttons or switches provided on an exterior surface of personal safety drone 240. In some embodiments, wherein personal safety drone 240 is stowed in a docking apparatus, the one or more physical buttons or switches could be provided on the docking apparatus, either in lieu of or in addition to any locations on the surface of the drone itself. Finally, as mentioned previously, personal safety drone 240 may also be launched or deployed on the basis of a wireless activation command or other instruction, received from a mobile computing device associated with Subject 220, or received from threat monitoring and response system 100.

After personal safety drone 240 has completed its initial deployment, which can involve expanding or unfolding from a more compact stowed position, activating one or more rotors or other propulsion mechanisms, and launching into the air, personal safety drone 240 can then fly to a pre-defined first position and/or perform a pre-defined first action, both of which can be stored as initial operational parameters in a memory of the personals safety drone 240. After navigating to a pre-determined or pre-configured position relative to Subject 220, e.g. five feet above and three feet in front of Subject 220, personal safety drone 240 immediately begins streaming monitoring data to threat monitoring and response system 100 for substantially real-time analysis. On the basis of this analysis, threat monitoring and response system 100 can control the subsequent actions and movements of personal safety drone 240 by generating and transmitting suitable control commands or updated operational parameters. However, in some embodiments one or more portions of the real-time threat analysis can be performed onboard personal safety drone 240, in order to avoid latency and bandwidth issues in transmitting large amounts of streaming video data and waiting to receive commands in return on the basis of a remote threat analysis performed by threat monitoring and response system 100.

As illustrated, while Subject 220 is preoccupied with the threat 260 immediately in front of him, an additional threat 262 approaches from behind, unbeknownst to Subject 220 (e.g. a second robber working in combination with the first robber). However, one or more of threat monitoring and response system 100 or a threat analysis system running onboard personal safety drone 240 may notice additional movement on the periphery of the video frame captured and by personal safety drone 240. At this point, additional movement may not constitute a direct threat, but can be considered to constitute a potential threat, i.e. demanding further investigation in order to reach a final determination. Accordingly, personal safety drone 240 can be commanded to fly to a greater height in order to a) provide continued video imagery of Subject 220 and the first threat 260 and b) permit a further investigation and analysis of the peripheral movement corresponding to the second threat 262. Based on such a further analysis the second threat 262 can be correctly identified and registered. Upon detection, system 100 may immediately command personal safety drone 240 to perform a suitable threat response, which could include emitting an audio alert to notify Subject 220 of the second individual creeping up behind him, i.e. "INDIVIDUAL BEHIND", or emitting an audio alert to frighten away or otherwise deter the second individual creeping up behind Subject 220. In some embodiments, the threat response executed by personal safety drone 240 could involve physical contact with one or more of Subject 220, the first threat 260, and the second threat 262, although such scenarios of physical contact are often undesirable options as they are associated with murky legal areas depending upon the current jurisdiction where personal safety drone 240 is operating.

In a third step, personal safety drone 240 has successfully eliminated the second threat 262 (e.g. by causing the individual sneaking up behind Subject 220 to flee) and only the first threat 260 remains. In this instance, personal safety drone 240 maintains contact with both Subject 220 and first threat 260, while additionally navigating to position itself between Subject 220 and first threat 260. In this manner, personal safety drone 240 can obtain a suitable field of view or sensor coverage for obtaining the monitoring data for transmission to threat monitoring and response system 100 and can additionally pose a physical deterrent or obstacle to the first threat 260. In some instances, such as when the individual posing first threat 260 attempts to flee, external or third party threat response resources 255 can be contacted and provided with suitable information to allow the threat response resources 255 to neutralize or otherwise address the first threat 260.

With the autonomous or semi-autonomous Subject following capabilities as described above in place, personal safety drone 240 can further be implemented as a platform to acquire additional sensor data and/or monitoring data for use by various components and sub-systems of threat monitoring and response system 100. For example, as mentioned previously it is contemplated that personal safety drone 240 can carry as a payload one or more cameras, including visible light and infrared cameras. Additional payloads and sensors are also possible, and can include without limitation microphones, speakers, distance sensors, lights/floodlights, strobe lights, radio beacons, location sensors, etc. In some embodiments, Subject 220 can select the specific payload desired to be carried on personal safety drone 240, as each payload item comes with a tradeoff in providing additional functionality at the expense of one or more of decreased flight time (due to increased weight), increased expense (due to additional component costs), increased storage volume (due to additional component size), etc. Accordingly, because the needs and requirements of each individual Subject can vary, each individual personal safety drone can be outfitted with a modular system, such as one or more receiving rails or standardized mounting points, such that desired payloads can be modified by the particular end-user of a given personal safety drone.

In some embodiments, various third-party drones can be configured to function as personal safety drone 240 in the context of threat monitoring and response system 100, for example by configuring a memory of the third-party drone with appropriate software to allow the drone to communicate with both threat monitoring and response system 100 and the monitoring application 182 running on a Subject's computing device 180a. In some embodiments, one or more authentication or approval protocols may be put in place in order to regulate the selection of third party drones that will be compatible with threat monitoring and response system 100. For example, the third party drones might be required to meet minimum performance and safety characteristics (flight time of 10+ minutes, has approved collision avoidance system, meets minimum required sustained speed, etc.) or might require a direct and express approval from threat monitoring and response system 100 itself. In some instances, the appropriate control software used to associate a third party drone with threat monitoring and response system 100 and otherwise make the third party drone suitable for use as a personal safety drone might be access controlled; that is, only distributed by or unlocked by threat monitoring and response system 100 to ensure the integrity of the selection of third party drones utilized with the system of the present disclosure. In some embodiments, a less restrictive or more permissive approach may be employed, with less or minimal regulation and oversight of the third party drones that can be employed with threat monitoring and response system 100 and/or as personal safety drones. In such embodiments, the appropriate drone control software needed for the third party drone can be made available by threat monitoring and response system 100 such that end users or Subjects can download and install the software on a third party drone of their choosing, without having to undergo lengthy or substantial authentication and verification protocols. In some embodiments, the needed drone control software might be provided by the manufacturer of the third party drone rather than by threat monitoring and response system 100, in which case one or more APIs (Application Programming Interfaces) and other associated documentation of threat monitoring and response system 100 can be provided to permit third parties to also write and develop drone control software for the third party drones.

From the perspective of the Subject, third party drones can be used to provide a wide range of personal safety drones, such that the Subject can purchase an off the shelf third party drone that is best suited to the Subject's needs and desires, or such that the Subject can customize a third party drone until it is uniquely suited to the Subject's needs and desires. In this manner, a Subject can not only select the desired payload for his or her personal safety drone, but can also select the desired performance and operational characteristics of the personal safety drone such that they are tailored to the particular use case of the Subject.

For example, consider a first Subject who is in grade school and has a 20 minute walk to and from school. The Subject lives in a safe neighborhood that is not known for crime, but his parents, acting in a Guardian capacity, naturally remain uncomfortable with the thought of the Subject walking alone for 40 minutes each day. As such, his parents may desire a personal safety drone to monitor the Subject continuously on his walk to and from school, streaming live video data to threat monitoring and response system 100 (where it can be continuously analyzed for the presence of any threats or potential threats). In some scenarios, the parents may desire the personal safety drone to stream live video to one or more of their own computing devices, e.g. such that the father, sitting at his desk at work, can monitor his son's walk to school every morning. In this manner, the parents may monitor the Subject on-demand or as desired, and when they are not monitoring the Subject the parents can still have the reassurance that threat monitoring and response system 100 is. Because the monitoring will be regular (i.e. every school day), the parents may not require a personal safety drone that can be stored and easily carried in a backpack for an emergency deployment, although such a personal safety drone may of course still be utilized. Similarly, the parents may not require a personal safety drone with advanced deterrent capabilities such as bright flashing lights and loudspeakers, as the personal safety drone will most likely only be needed to perform regular monitoring duties. However, the parents may desire a personal safety drone capable of two way communication such that they (or threat monitoring system 100) can audibly and/or visually interact with the Subject. For example, the personal safety drone could be configured to fly in front of the Subject, with a display screen mounted on the personal safety drone facing the Subject. This screen could be used to display helpful information (e.g. navigational directions or reminder text), or a video chat with the parents, etc. In this manner, a personal safety drone can be configured to best suit a daily monitoring task with the primary goal of providing reassurance to the parents and the Subject.

In a different example, consider a second Subject who has a 30 minute walk home from her job at a bar, which she typically leaves well after midnight. In this use case, the second Subject might desire a personal safety drone with enhanced safety and deterrent features, in addition to monitoring capabilities to feed video data to threat monitoring and response system. This second Subject may also require her personal safety drone to be compact and easily concealable in her purse, pocket, or hand, and also able to deploy and launch in a matter of seconds. As compared to the first Subject, who was subject to predictable and daily monitoring, this second Subject requires emergency and on-demand monitoring, e.g. in response to a 'panic' mode button being engaged. The payload for such a personal safety drone might include a bright light, to both illuminate the way when walking in dark or dimly-lit areas and to deter or disorient threatening individuals approaching the second Subject. The payload may further include active deterrent means, such as pepper spray or an indelible ink that can be sprayed onto a fleeing perpetrator in order to more easily allow the authorities to later identify him. Safety oriented drones can additionally include locator or beacon devices to more easily allow local authorities, such as the police, to more quickly locate the Subject when responding to a threat. For example, if threat monitoring and response system 100 detects a threat, the system will contact local authorities and request an emergency response, transmitting information such as the Subject's location, the nature of the ongoing threat, and any other information that may be helpful to assist in the emergency response. However, the Subject's location, typically determined through methods such as GPS, cellular tower triangulation, WiFi location maps, etc., can be inaccurate, or even if accurate, the emergency responders may be unfamiliar with the area in which the Subject is located. Accordingly, an emergency beacon can provide a physical means by which the police can locate the Subject. For example, an emergency beacon could be: a floodlight configured to point straight upwards, providing a visual indication of the Subject's location; a specific radio signal emitted by the personal safety drone such that emergency responders, by navigating to the source of the specific radio signal, will find the Subject (i.e. radio direction finding); or a passive reflector that will reflect an interrogation pulse transmitted by the emergency responders.

The above to scenarios are provided by way of illustration only, and it is appreciated that various other personal safety drone designs, configurations, and payloads can be implemented and provided for Subjects depending on the specific use case and requirements of each individual Subject. However, regardless of the specific personal safety drone employed, it is contemplated that each personal safety drone is capable of receiving the previously mentioned software enabling two different communication channels: a first between the personal safety drone and the monitoring application 182 of the Subject's computing device, enabling the Subject to activate or control the personal safety drone, and enabling monitoring application 182 to act as a wireless access point/relay for the personal safety drone; and a second between the personal safety drone and threat monitoring and response system, enabling the personal safety drone to stream live video and other collected sensor data to threat monitoring and response system 100 for storage and analysis, and enabling threat monitoring and response system 100 to transmit one or more control commands to the personal safety drone. Note that in embodiments where the monitoring application 182 causes the Subject's computing device to act as a wireless access point or a relay for the personal safety drone, then only one physical communication channel is required—the second channel between the personal safety drone and the threat monitoring and response system 100 becomes a notional channel, defined by the participants rather than discrete hardware which enables the communication channel.

Area Safety Drone

In some embodiments, the personal safety drone(s) described above can be implemented to monitor more than one Subject, or even to monitor multiple Subjects, such as the attendees of an event. In such scenarios, wherein there is no longer a one-to-one correspondence between a single Subject and a drone, the drone can be referred to as an area safety drone rather than a personal safety drone, in which case the area safety drone can be substantially similar in physical construction to the personal safety drone. In some embodiments, area safety drones can be different in physical construction as compared to the personal safety drone, such that the area safety drone is designed specifically with area safety functionality in mind, e.g. area safety drones might be larger, have a greater range, top speed, payload capacity, payload sensors and equipment, etc. In various embodiments, a given area safety drone can be configured to monitor: a fixed subset of Subjects (e.g. a group of friends, or some selected portion of a larger crowd); a dynamically changing set of Subjects (e.g. all Subjects within the drone's field of view, all Subjects in a given area that are registered with threat monitoring and response system 100); or a static area that may or may not contain Subjects (e.g. monitor a specific venue, specific geo-fenced area, etc. in a similar manner to how a security camera monitors a specific area. Note that unlike a security camera, an area safety drone can monitor a fixed area while still itself moving or patrolling).

For example, FIGS. 3A and 3B depict different configurations in which a fleet of six area safety drones A-F might be deployed to monitor a large crowd at a concert venue. In FIG. 3A, the six area safety drones A-F are deployed into six regions of equal size, e.g. in a grid-like manner. This approach does not heavily weigh the density of Subjects or potential threats that are present into each region to be monitored, but instead prioritizes an even distribution of area safety drones in order to provide the most consistent response times when a threat is detected.

On the other hand, FIG. 3B depicts a scenario in which the six area safety drones A-F are deployed into six regions which contain an equal number of Subjects by vary in size. That is, FIG. 3B depicts a density-based deployment rather than a geometry-based deployment—more individuals congregate near at the front, near the concert stage, so a commensurately increased number of area safety drones are deployed to this portion of the concert venue. This approach does not heavily weigh equal response times in all regions (e.g. area safety drone F covers the largest region and will likely have much slower response times compared to the other area safety drones A-E which each cover smaller regions), but instead prioritizes an even distribution of the monitoring capacity provided by area safety drones in order to ensure that no one drone is over or underutilized. In some embodiments, a hybrid of these two approaches may be utilized Accordingly, one or more area safety drones can be employed to monitor groups of people and/or events, and more particularly, employed to permit threat monitoring and response system 100 to more effectively monitor the groups of people and/or events through the large amounts of monitoring data collected by the one or more area safety drones. In some embodiments, a dedicated Regional Command Center (RCC) 130 can be created or assigned to handle large events and the fleet of area safety drones employed to monitor the event. In this manner, the monitoring data received from the area safety drones, and more importantly the threats or potential threats extracted from it, can be handled via the dedicated Regional Threat Response control system 134 and Threat Response Management system 136 of the dedicated RCC 130. Such a configuration can be particularly helpful in the context of events or gatherings where large crowds are expected, or more particularly, when a large number of threats and potential threats are anticipated. The computational burden of processing the incoming monitoring data from the fleet of area safety drones is oftentimes not the bottleneck in the threat monitoring and response provided by system 100. Rather, it is the human elements, and namely, the human element of threat response resources 140, that causes bottlenecks and delays in threat resolution.

FIG. 3C depicts an example environment 302 in which nine area safety drones A-I are deployed. Although shown in a grid pattern, it is appreciated that the area safety drones can be deployed in other configurations, including but not limited to the Subject density based deployment approach described above with respect to FIG. 3B. Various interactions and scenarios that may confront area safety drones are depicted in the example environment 302. Each of the nine area safety drones A-I is associated with a given operational status, e.g. 'Patrol', 'Alert', and 'Active'. 'Patrol' is the default or standby state when a given area safety drone is collecting monitoring data but not preparing for the possibility of responding to a threat; 'Alert' is the state when a given area safety drone prepares for the possibility of being mobilized or deployed to respond to a threat; and 'Active' is when an area safety drone is currently in the process of responding to a threat.

For example, as contemplated in FIG. 3C, area safety drones G and H are in the 'Active' state as they are responding to a first threat 360a and a second threat 360b facing Subject 320. The immediately adjacent area safety drones D and E are placed in the 'Alert' state in order to prepare for or anticipate the possibility that they may be needed to assist area safety drones G and H in the threat response to threats 360a and 360b Similarly, area safety drones F and I are in the 'Active' state as they are responding to a third threat 362 to Subject 322. The immediately adjacent safety drone E has already been placed in the 'Alert' state due to threats 360a and 360b, so no further action is needed, by the area safety drone C is newly placed in the 'Alert' state to prepare for or anticipate the possibility that it may need to assist in the threat response to threat 362. The remaining area safety drones A and B remain in the 'Patrol' mode as they are neither responding to any threats nor immediately adjacent to any area safety drones that are responding to a threat. When area safety drones are in the 'Active' state and responding to a threat, two different approaches are depicted in FIG. 3C. In a first approach, it is contemplated that a given area safety drone can interact with multiple threats simultaneously and/or interact with multiple subjects and threats simultaneously. In a second approach, it is contemplated that a given area safety drone interacts with a single threat or single Subject.

This first scenario of multiple interactions per area safety drone is presented in the bottom left corner of environment 302, where a Subject 320 is faced with first threat 360a and second threat 360b. In response to these threats, area safety drone G navigates away from its default/patrol location 370g and moves towards the threats, while area safety drone H likewise navigates away from its default/patrol location 370h to move towards the threats. Here, both area safety drones G and H will interact with Subject 320 and are further configured to interact with both threats 360a, 360b as needed or as possible. In particular, area safety drone G is shown to be interacting with both threats 360a, 360b because it has a direct line of sight to both. However, area safety drone H is only shown to be interacting with second threat 360b because its line of sight to first threat 360a is blocked by Subject 320.

The second scenario of one interaction per area safety drone is presented in the bottom right corner of environment 302, where a Subject 322 is faced with a threat 362. In response to threat 362, area safety drone I navigates away from its default/patrol location 370i to move towards threat 362 and area safety drone F navigates away from its default/patrol location 370f to move towards Subject 322. Whereas area safety drones G and H provide a blanket threat response, wherein each area safety drone is configured to assume any role as needed, the area safety drones F and I provide a directed threat response, wherein each area safety drone plays a specialized role and assumes only a particular role in the overall threat response.

In some embodiments, rather than being some external actor or factor, a detected threat might be a medical emergency experienced by a Subject. For example, at large venues and events such as concerts, it is much more likely that any detected threats will be medical emergencies rather than violence. As such, one or more of the fleet of area safety drones can be equipped with a medical aid or assistance payload in addition to or in lieu of the payload provided on the standard area safety drones configured for the given event. In the following description, such a drone with a medical payload will be described as a paramedic drone 342, although of course other names or labels are possible.

As illustrated, a Subject 324 is depicted as having a medical emergency, which has been classified by threat monitoring and response system 100 as a threat to Subject 324, and more particular, a threat to the health and wellbeing of Subject 324. In some instances, the density of a crowd, the ruggedness of terrain, or other obstacles can prevent a rapid emergency response by human threat response resources (such as the human threat response resources 140 of FIG. 1) even when the emergency responders are deployed immediately upon detection of the threat/medical emergency by threat monitoring and response system 100. Accordingly, paramedic drone 342 can be configured to offer supporting aid (e.g. scenarios wherein human emergency responders or EMTs will be arriving shortly) or to offer primary aid (e.g. no human emergency responders or EMTs are imminently arriving). The complexity of configuring paramedic drone 342 to offer supporting aid will typically be much lower than the complexity of configuring paramedic drone 342 to offer primary aid. In some embodiments, when Subject 324 makes available biometric information to threat monitoring and response system 100, this biometric information can be passed to paramedic drone 342, human emergency responders, and/or employed by threat monitoring and response system 100 to best assess the condition of Subject 324 in light of the ongoing medical emergency and to subsequently determine an appropriate or most suitable threat response. Additionally, if Subject 324 is known or registered with threat monitoring and response system 100, then system 100 can obtain medical records of Subject 324 to determine how (if at all) the Subject's medical history may influence the treatment and threat response that is mobilized. For example, if Subject 324 is allergic to a certain medicine, threat monitoring and response system 100 will ensure that paramedic drone 342, a human emergency responder, or any other threat response resource 140 will administer that medication to Subject 324.

Supporting aid can consist of an audiovisual communication interface to permit a remotely located paramedic or doctor to assess the situation of the medical emergency to a) update the emergency responders who are enroute as to the nature of the emergency they will need to deal with and b) provide guidance to Subject 324 and/or any bystanders as to how to begin rendering first aid or suitable treatment. For example, if Subject 324 suffers heatstroke at a crowded concert, paramedic drone 342, acting in a supporting role, can provide an audiovisual interface whereby a remote EMT (e.g. at the medical tent of the concert) can make an initial diagnoses and provide first aid instructions. More particularly, the remote EMT could use one or more cameras or medical probes (such as a wireless or non-contact thermometer) configured as payload instruments of paramedic drone 342 to examine Subject 324 and make an initial diagnosis of heatstroke. The remote EMT could then use the audiovisual interface on paramedic drone 342 to provide instructions to bystanders to rehydrate Subject 324 and provide shade or a fan if possible. Concurrently, as the emergency responders continue to make their way to Subject 324, paramedic drone 342 could initiate a beacon or signaling operation to more effectively enable the emergency responders to locate Subject 324 in the crowd of concertgoers. In addition to the beaconing techniques discussed previously with respect to personal safety drone 240, paramedic drone 342 could additionally, for example, fly to a suitable height above the crowd (e.g. 10-20 feet) and deploy a highly visible banner, ribbon, or some other high visibility or reflective material that dangles beneath paramedic drone 342 to indicate the location of Subject 324 to the emergency responders.

In instances wherein paramedic drone 342 is configured to render primary aid (e.g. even though emergency responders are on the way Subject 324 needs immediate medical attention, Subject 324 is in a remote or inaccessible location, etc.), paramedic drone 342 most likely will need to be more robust and configured with a more extensive payload than in the supporting aid configuration described above, as paramedic drone 342 in the primary aid configuration must be self-sufficient and can not necessarily rely upon human emergency responders arriving with additional medical equipment and supplies as needed. In some scenarios, a fleet of area safety drones, such as the fleet of area safety drones A-I, might be deployed to include several supporting aid paramedic drones and one or two primary aid paramedic drones, which in tandem can provide a wide array of threat monitoring and emergency response capabilities. In the specific case of a primary aid paramedic drone, one or more robotic arms or interfaces may be included in order to interact with Subject 324 to perform tasks that Subject 324 is unable to perform himself, due to either unconsciousness, lack of expertise, or the specific nature of the injury or medical emergency. These robotic arms can be configured to deploy or otherwise make use of additional medical supplies also equipped as part of the payload of the primary aid paramedic drone. Such medical supplies can include, but are not limited to: bandages, sutures, medications, inhalers, oxygen masks, splints, tourniquets, IV fluids and needles, etc. In some embodiments, the primary aid paramedic drone may be configured to provide assistance to Subject 324 under the assumption that no human emergency or medical assistance will be immediately forthcoming (e.g. greater than 24 hours away). In certain scenarios, human emergency and medical assistance may be shortly forthcoming (e.g. less than an hour), but the severity of the medical emergency dictates that a primary aid paramedic drone be deployed rather than a supporting aid paramedic drone, due to the more robust and sophisticated capabilities of the primary aid paramedic drone. The determination of which type of paramedic drone to deploy can be made by threat monitoring and response system 100 based on one or more inputs of monitoring data collected by the fleet of area safety drones or other sources of monitoring data that are available to the system 100.

More particularly, content classification system 116 of Global Intelligence Center 110 can analyze, in conjunction with Machine Learning system 117, the incoming monitoring information from one or more area safety drones A-I in order to assess the severity of the medical emergency and determine the appropriate level of response, e.g. the mix of supporting aid drones, primary aid drones, human emergency responders, and other threat response resources that are to be deployed. In some embodiments, particular those in which primary aid paramedic drones are required, a primary aid paramedic drone might be configured to be sufficiently powerful to operate in conjunction with one or more other such drones to perform an airlift of the individual suffering the medical emergency to a location more suitable for receiving emergency medical attention.

Although the above description of both personal safety and area safety drones has been made in the context of Subjects or other groups of individuals, it is also contemplated that both personal safety and area safety drones can be employed in other contexts. For example, personal safety drones could be employed inside of the home to monitor a child left home alone, wherein the personal safety drone is utilized in lieu of hiring a human babysitter. In a particular home environment embodiment, a docking station or cradle might be provided which allows the personal safety drone to charge its battery. Preferably, this docking station is installed in a location that allows the drone to perform monitoring while it is charging, e.g. docking station installed on a ledge with a view of a baby's crib.

In some embodiments, personal safety drones and area safety drones can be employed in the context of a corporate campus, such that the drones can provide both protection, security, and monitoring to ensure the safety of the various employees of the corporation, but also such that the drones can provide monitoring of the employees as desired or configured by the corporation. For example, a fleet of area safety drones could patrol outdoors, keeping the corporate campus secure from any intruders, undesired guests, or other individuals attempting to enter undetected. A second fleet of area safety drones could patrol inside of the campus, for example inside of highly secured areas to provide an additional measure of security and threat response capabilities, or inside general work and employee areas in order to monitor for prohibited employee behaviors such as theft, bullying, excessive procrastination or performance of non-work related tasks, etc. While many corporate campuses and corporate environments currently employ some form of camera or video based monitoring, these solutions are largely static, as even cameras with an adjustable field of view are ultimately fixed in position, e.g. mounted on a wall or ceiling. Advantageously, the use of personal safety drones and/or area safety drones can not only address shortcomings of fixed cameras by eliminating blind spots, improving tamper resistance, and providing a mobile field of view, but furthermore can supplement or replace the use of expensive and sometimes error-prone human security officers to monitor camera feeds for intruders or other threats.

Further still, the presently disclosed personal and area safety drones can be employed in the context of military and police operations. For example, it is often the case that a given military service member is in far greater danger or experiences far greater exposure to threats than the average member of the public. In instances where stealth is not paramount, service members could be registered with personal safety drone, or groups of service members could be registered with area safety drones. The monitoring data captured by such drones can prove invaluable, as soldiers are most typically deployed to remote or inhospitable areas that do not have existing infrastructure to capture monitoring data for threat monitoring and response system 100 as compared to, for example, a city environment. By the same token, due to these remote and inhospitable areas and/or the impact of combat on 'normal' emergency response teams and medical facilities, soldiers frequently have to rely on combat medics to attend to their injuries. Due to the chaotic nature of battlefields or combat zones and/or due to personal risk posed to the combat medic, there are instances where combat medics cannot locate an injured solider or cannot safely reach him to provide immediate medical assistance. In these scenarios, the supporting aid and primary aid paramedic drones described above can prove invaluable, providing threat response and medical support in situations which this previously would have been impossible or infeasible to achieve. Further still, a fleet of area safety drones can provide the input monitoring data to threat monitoring and response system 100 to immediately locate or otherwise recognize in real-time soldiers who have obtained injuries or otherwise require medical assistance or attention, thereby allowing injuries to be reported quicker than when human reporting (e.g. over radio) is relied upon.

Although it is contemplated that the same threat monitoring and response system 100 described previously can be employed in these military and police contexts, in some embodiments it may be necessary to provide a separate infrastructure from that exposed to civilian Subjects, due at least in part to the sensitivity of the data involved in various military operations, whether undertaken during peacetime or during active conflict. Similarly, the various drone hardware and platforms can be modified or hardened to be suitable for military or police deployments (e.g. more rugged, more resistant to harsh environmental conditions, greater performance characteristics, increased range, etc.). In some embodiments, the payloads of these various drones can also be modified. For example, whereas it may be legally difficult or impossible to outfit a personal or area safety drone with defense mechanisms, let alone weapons, the same is not necessarily true of military and police applications, where it can be desirable to include one or more weapons in the payload of the personal safety and/or area safety drones. In still further embodiments, a fleet of area safety drones can be placed into coordinated cooperation, either autonomous or semi-autonomous. Such coordinated maneuvering is sometimes referred to as a drone swarm, wherein a plurality of drones operates in either direct or indirect cooperation to achieve a common goal or set of goals. While the area monitoring achieved by a fleet of area safety drones (such as that described in the civilian context for monitoring a concert venue) constitutes a type of drone swarm, drones operating in military or police contexts can be configured to more aggressively or actively operation in cooperation in a manner that would be either cost prohibitive or prohibited in the civilian world.

Personal Assistant Drone

In addition to the personal and area safety embodiments discussed above, it is also contemplated that a Subject can employ a drone for personal use and even recreation. For example, a personal drone could be used in a videography mode to capture artistic or other recreational video recordings of the Subject rather than monitoring video data, although of course other personal uses are contemplated. In such personal uses, it is contemplated that the same or a similar drone platform to those variously described above can be employed, and in some instances, even the same payloads can be employed. That is, in some embodiments a given drone hardware configuration can be employed as both a personal safety drone, an area safety drone, and a personal assistant drone, with the switch between functionality or mode effected by changing the drone software, or by using the existing drone software and transmitting a command to cause the drone to switch modes. The same general control functionalities and communication paths and methodologies as described above in the context of the personal safety drone can be likewise employed with a personal assistant drone, e.g. running remote processing, analysis, and computationally intensive tasks at the threat monitoring and response system 100, pairing the drone with a Subject's monitoring application 182 for local control, commands, and interaction, and so on.

In some embodiments, a drone platform may be equipped with a payload specific to the desired personal assistant functionality. For example, in the context of the videography drone introduced above, the payload may be modified to contain one or more of: a higher quality camera, additional cameras, an interchangeable lens system, higher quality microphones, a wind-noise cancellation system, a local data store, improved drone or image stabilization components (e.g. gimbal), additional batteries, more powerful and responsive drive motors, a camera control arm independently movable from the drone platform, etc. Using one or more of these payload components, the videography drone can capture far higher quality stills and videos. The subject matter of these captures can be controlled by the Subject in a variety of ways. For example, in order to capture the desired footage, the Subject may actively steer the drone, the Subject may actively steer the drone and an attached camera arm, or the Subject may actively steer an attached camera arm while allowing the drone to operate in a semi-autonomous manner. Additionally, the videographer drone can be programmed to follow one or more routines or paths, similar to the manner in which the personal safety drone can be programmed to follow a Subject or execute other flight or control routines. For example, a Subject may configure the videographer drone to capture video footage from a fixed perspective in front of the Subject while the Subject skis down a mountain, or may configure to videographer drone to begin by capturing point of view footage as the Subject skis down the mountain and to then transition to a birds-eye perspective by flying above the Subject while continuing to capture video data.

In other examples, the videographer drone may operate in fully autonomous fashion, guided only by certain commands received from the Subject, either detected by the drone or monitoring system 100 (e.g. verbal commands) or received in monitoring application 182 of the Subject's computing device. For example, the Subject can position themselves in front of an attractive background or notable object and then command the drone 'Take Selfie', which will be interpreted as an instruction for the drone to fly in front of the Subject and position his or her face (e.g. with the assistance of facial recognition) in a suitable location of the photographic frame (e.g. centered, following rule of thirds, etc.) and automatically capture one or more pictures of the Subject. In some embodiments, the Subject can pre-configure or Machine Learning system 117 of GIC 110 can learn, one or more photographic preferences relating to composition, color correction, and image editing such that all images captured by the videographer drone are automatically in conformance with these photographic preferences of the Subject.

More broadly, whereas the personal safety drone was configured to respond to various voice commands or flight routines specifying a monitoring position or action to take, the videographer drone can be configured to respond to various commands or videography routines specifying a certain angle or type of shot to capture of an indicated subject matter. Just as the personal safety drone could be programmed with a specific flight path including specific coordinates and vectors, or could be controlled with a natural language representation of the same, the videographer drone can be programmed with a specific flight path and movements to take the camera lens through, or can be controlled with a natural language representation of the desired shot type. In some embodiments, various hand and body language commands can be employed rather than verbal commands, which can be particularly valuable in video applications where extraneous audio is undesirable.

We claim:

1. A method for threat monitoring with a drone, the method comprising:
    receiving, at a first drone, an activation command indicating a given user's need for monitoring;
    deploying the first drone based on one or more of the activation command and a set of initial operational parameters, such that the first drone autonomously navigates to a first position with respect to the given user and performs a first configured action;
    capturing, using one or more sensors on the first drone, a plurality of monitoring data signals corresponding to one or more of the given user and a given environment surrounding the given user, wherein the plurality of monitoring data signals comprises at least sound or images captured by the one or more sensors;
    transmitting, using a wireless transceiver on the first drone, one or more of the plurality of monitoring data signals to a remote monitoring system;
    continuously analyzing, in response to the activation command, the plurality of monitoring data signals to generate updated operational parameters causing the first drone to autonomously navigate to at least a second position with respect to the given user and perform at least a second configured action, wherein:
        the continuously analyzing comprises analyzing the monitoring data signals in order to recognize and track the given user in one or more environments surrounding the given user;
        the given user is recognized and tracked using a machine vision system running on one or more onboard processors of the first drone; and
        the machine vision system is configured with image-based identifying characteristics uniquely associated with the given user, the identifying characteristics pre-configured in an onboard memory of the first drone, wherein the machine vision system recognizes the given user in the images captured by the one or more sensors based on the pre-configured identifying characteristics uniquely associated with the given user, wherein the recognition of the given user is performed in response to the activation command; and
    performing at least a third configured action, wherein the third configured action is received at the wireless transceiver on the first drone from the remote monitoring system, and wherein the third configured action is generated based on a threat analysis of the one or more transmitted monitoring data signals performed by the remote monitoring system.

2. The method of claim 1, further comprising capturing a second plurality of monitoring data signals corresponding to a detected threat to the given user, wherein one or more of the updated operational parameters and the third configured action are generated based on the second plurality of monitoring data signals.

3. The method of claim 1, wherein the continuously analyzing comprises analyzing the sound or images captured by the one or more sensors to extract one or more user commands initiated by the given user, and wherein the updated operational parameters are generated based on the extracted user commands.

4. The method of claim 3, wherein the one or more user commands comprise voice commands spoken by the given user, gesture commands performed by the given user, or both.

5. The method of claim 1, wherein the continuously analyzing is performed by the remote monitoring system and the updated operational parameters are received by the wireless transceiver on the first drone.

6. The method of claim 1, wherein the continuously analyzing is performed by one or more onboard processors of the first drone and the updated operational parameters are received by a flight controller on the first drone.

7. The method of claim 1, wherein the continuously analyzing is performed by one or more processors of a mobile computing device associated with the given user and the updated operational parameters are received by the wireless transceiver on the first drone.

8. The method of claim 1, wherein the activation command comprises the given user actuating a physical button or switch located on a body of the first drone.

9. The method of claim 8, wherein the first drone is stowed on the person of the given user in a stowed configuration, and wherein deploying the first drone causes the first drone to enter an expanded configuration and activate one or more propulsion units located on the first drone.

10. The method of claim 1, wherein the activation command is determined from one or more external monitoring data signals corresponding to one or more of the user and the environment surrounding the user.

11. The method of claim 10, wherein the activation command is received at the wireless transceiver of the first drone from one or more of the remote monitoring system and a mobile computing device of the given user.

12. The method of claim 10, wherein the activation command is received at the wireless transceiver of the first drone from one or more sources of the external monitoring data signals.

13. The method of claim 11, wherein the activation command contains an indication of a current location of the given user and the first drone autonomously navigates to the first position based at least in part on the indication of the current location of the given user.

14. The method of claim 1, wherein the first position comprises a pre-defined separation between the first drone and a first reference point, wherein the pre-defined separation is measured along at least one dimension.

15. The method of claim 1, wherein the first configured action causes the first drone to autonomously navigate through the given environment in order to dynamically maintain the pre-defined separation between the first drone and the first reference point.

16. The method of claim 14, wherein the first reference point is located on the person of the given user or is associated with a ground point of the given environment.

17. The method of claim 1, wherein the capturing and transmitting the monitoring data signals comprises the first configured action.

18. The method of claim 1, wherein the initial operational parameters are selected from one or more sets of pre-defined initial operational parameters stored in an onboard memory of the first drone, wherein the pre-defined initial operational parameters are input by the given user or are received from the remote monitoring system.

19. The method of claim 1, wherein the third configured action comprises an interaction between one or more payload components of the first drone with the given user or with a threatening entity detected by the threat analysis.

20. The method of claim 1, further comprising deploying a second drone based on one or more of the activation command and the set of initial operational parameters, such that the second drone autonomously navigates to a respective position relative to the given user and performs a respective configured action.

21. The method of claim 20, further comprising:
deploying the first drone with a first set of payload components; and
deploying the second drone with a second set of payload components;
wherein the second set of payload components contains at least one unique payload component that is not contained in the first set of payload components.

22. The method of claim 20, further comprising:
capturing, using one or more of the second set of payload components of the second drone, a plurality of supplemental monitoring data signals corresponding to one or more of the given user and the given environment;
transmitting, using a wireless transceiver on the second drone, the plurality of supplemental monitoring data signals to at least the first drone; and
continuously analyzing, at one or more onboard processors of the first drone, the plurality of monitoring data signals and the plurality of supplemental monitoring data signals in order to generate the updated operational parameters.

23. The method of claim 22, further comprising performing, with the second drone, a configured action received by the second drone from the first drone, wherein the configured action is generated based on the continuous analysis performed by the first drone.

24. The method of claim 20, further comprising:
capturing, using one or more of the second set of payload components of the second drone, a plurality of alternate monitoring data signals corresponding to one or more of the given user and the given environment, wherein the alternate monitoring data signals are captured from a different point of view (POV) than the POV of the sensors on the first drone; and
transmitting, using a wireless transceiver on the second drone, one or more of the alternate monitoring data signals to the remote monitoring system.

25. The method of claim 20, further comprising:
determining that the first drone has failed or has lost the ability to transmit communications via its wireless transceiver; and
in response to the determining, performing the role of the first drone with the second drone.

26. The method of claim 1, wherein the one or more of the plurality of monitoring data signals are transmitted via the wireless transceiver on the first drone to at least a first remote monitoring system and a second remote monitoring system, wherein the first remote monitoring system is separate from the second remote monitoring system.

27. The method of claim 26, wherein the third configured action is received at the wireless transceiver on the drone from one or more of the first remote monitoring system and the second remote monitoring system, and wherein the third configured action is generated based on a threat analysis of the one or more transmitted monitoring data signals performed by one or more of the first remote monitoring system and the second remote monitoring system.

28. The method of claim 1, wherein the one or more sensors on the first drone comprise one or more of: a visible light camera, an infrared camera, a microphone, a speaker, a distance sensor, a radar, a lidar, an illuminating light, a strobe light, a radio beacon, a location sensor, a chemical concentration sensor, a biometric sensor, a temperature sensor, an altitude sensor, and a pressure sensor.

29. The method of claim 1, wherein the wireless transceiver on the first drone transmits the one or more of the plurality of monitoring data signals to a mobile computing device of the given user and the mobile computing device of the given user subsequently relays the one or more of the plurality of monitoring data signals to the remote monitoring system.

30. The method of claim 20, wherein the second drone is deployed based on one or more second activation commands or a second set of initial operational parameters.

31. The method of claim 20, wherein the second drone is selected from a group comprising a plurality of additional drones, wherein one or more of the plurality of additional drones is substantially identical to the first drone or the second drone.

32. The method of claim 20, further comprising capturing, using one or more of the second set of payload components of the second drone, a plurality of supplemental monitoring data signals corresponding to one or more of the given user and the given environment.

33. The method of claim 32, further comprising continuously analyzing, at one or more onboard processors of the second drone, the plurality of supplemental monitoring data signals in order to generate updated operational parameters for the second drone.

34. The method of claim 32, further comprising transmitting, using a wireless transceiver on the second drone, the plurality of supplemental monitoring data signals to at least the remote monitoring system.

35. The method of claim 33, further comprising performing, with the second drone, a configured action received by the second drone from the remote monitoring system, wherein the configured action is generated based on a continuous analysis performed by the remote monitoring system on one or more of the plurality of supplemental monitoring data signals.

* * * * *